(12) United States Patent
Noguchi et al.

(10) Patent No.: US 8,319,737 B2
(45) Date of Patent: Nov. 27, 2012

(54) DISPLAY DEVICE AND A METHOD OF DRIVING THE SAME

(75) Inventors: Koji Noguchi, Kanagawa (JP); Daisuke Takama, Kanagawa (JP)

(73) Assignee: Sony Corporation, Tokyo (JP)

( * ) Notice: Subject to any disclaimer, the term of this patent is extended or adjusted under 35 U.S.C. 154(b) by 919 days.

(21) Appl. No.: 12/382,712

(22) Filed: Mar. 23, 2009

(65) Prior Publication Data

US 2009/0256818 A1   Oct. 15, 2009

(30) Foreign Application Priority Data

Apr. 11, 2008   (JP) .................. 2008-104079

(51) Int. Cl.
*G09G 5/00*   (2006.01)

(52) U.S. Cl. ........... 345/173; 345/87; 345/175; 345/204

(58) Field of Classification Search .................... 345/87, 345/89, 173–183, 204
See application file for complete search history.

(56) References Cited

U.S. PATENT DOCUMENTS

| | | | |
|---|---|---|---|
| 2003/0147041 A1* | 8/2003 | Oh et al. ................... | 349/187 |
| 2008/0218650 A1* | 9/2008 | Koshihara et al. ............... | 349/39 |
| 2008/0259044 A1* | 10/2008 | Utsunomiya et al. ......... | 345/173 |
| 2010/0090975 A1* | 4/2010 | Nagata et al. ................. | 345/174 |

FOREIGN PATENT DOCUMENTS

JP   2008-009750   1/2008

* cited by examiner

*Primary Examiner* — Quan-Zhen Wang
*Assistant Examiner* — Jennifer Nguyen
(74) *Attorney, Agent, or Firm* — Rader Fishman & Grauer, PLLC

(57) ABSTRACT

A display device including: a plurality of pixels; pixel electrodes; n (n≧2) counter electrodes; a display functional layer; a write drive scanning portion; detection electrodes; an alternate current drive scanning portion; and a detecting portion.

15 Claims, 15 Drawing Sheets

FIG.3A
FIG.3B
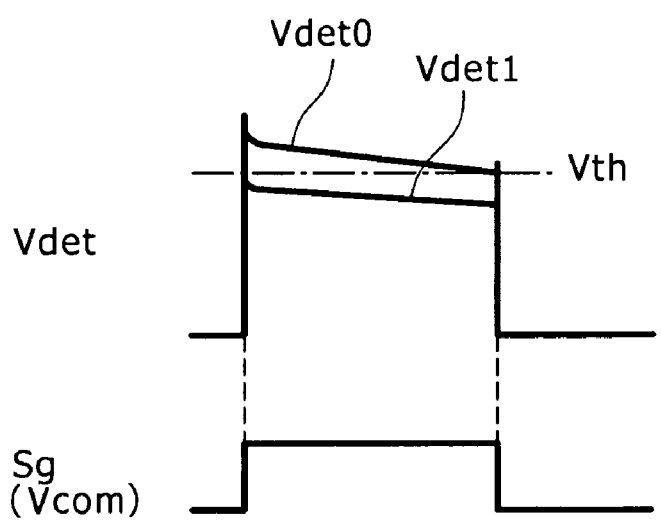
FIG.3C
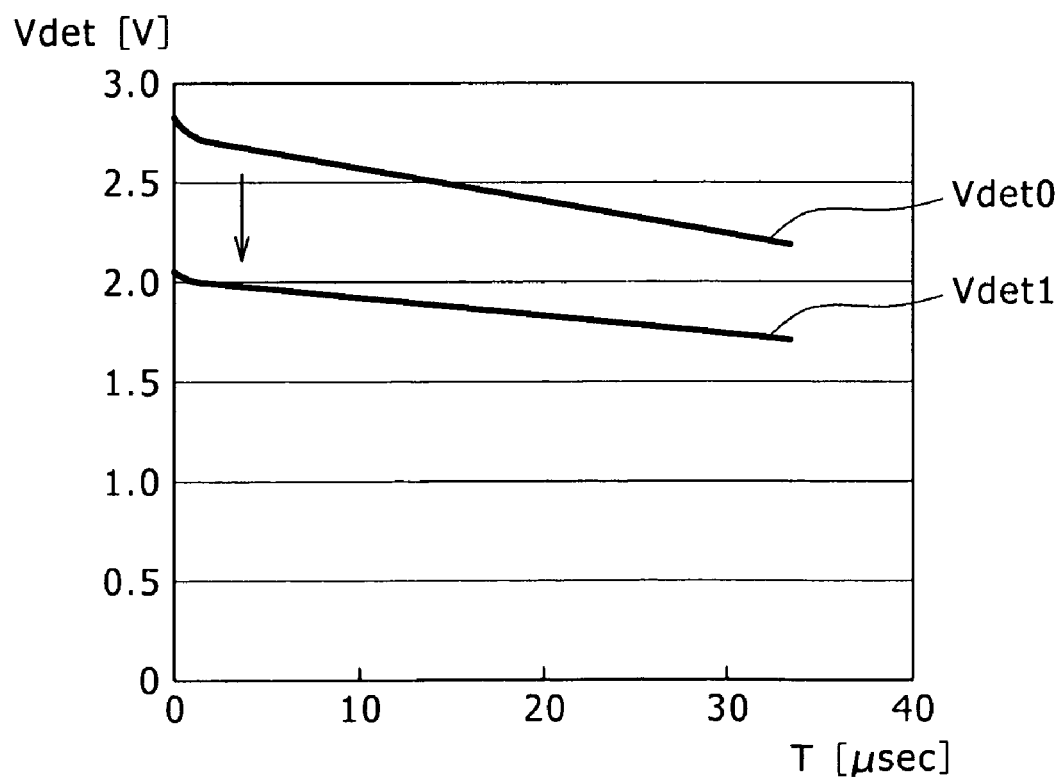

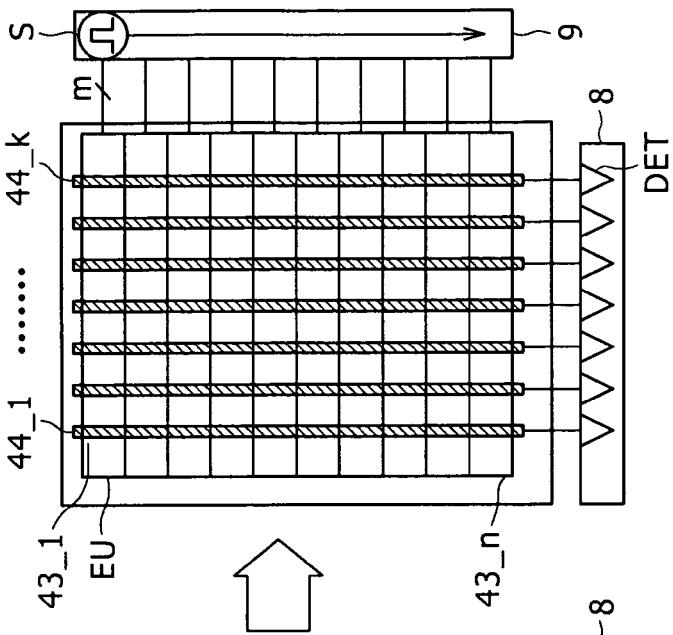
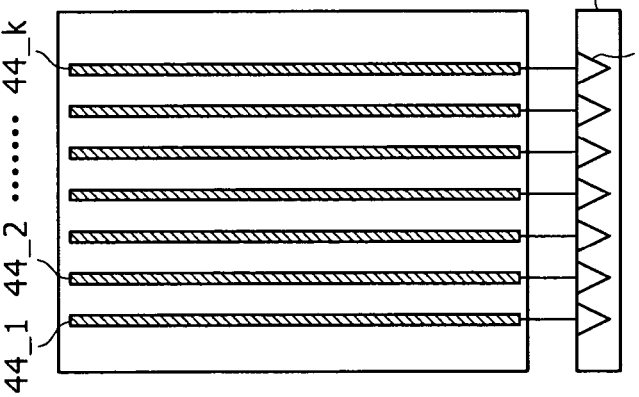
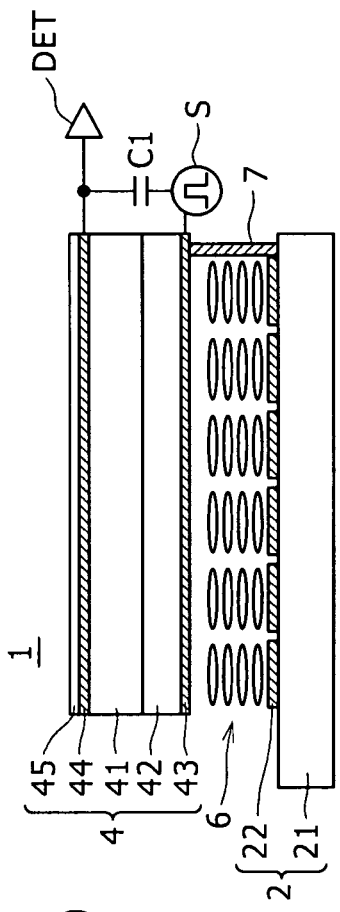

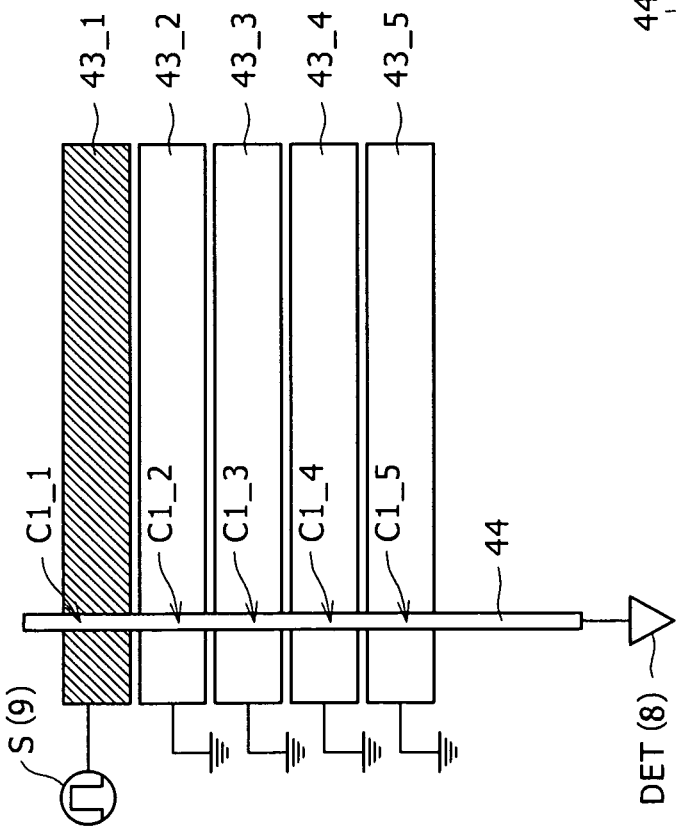
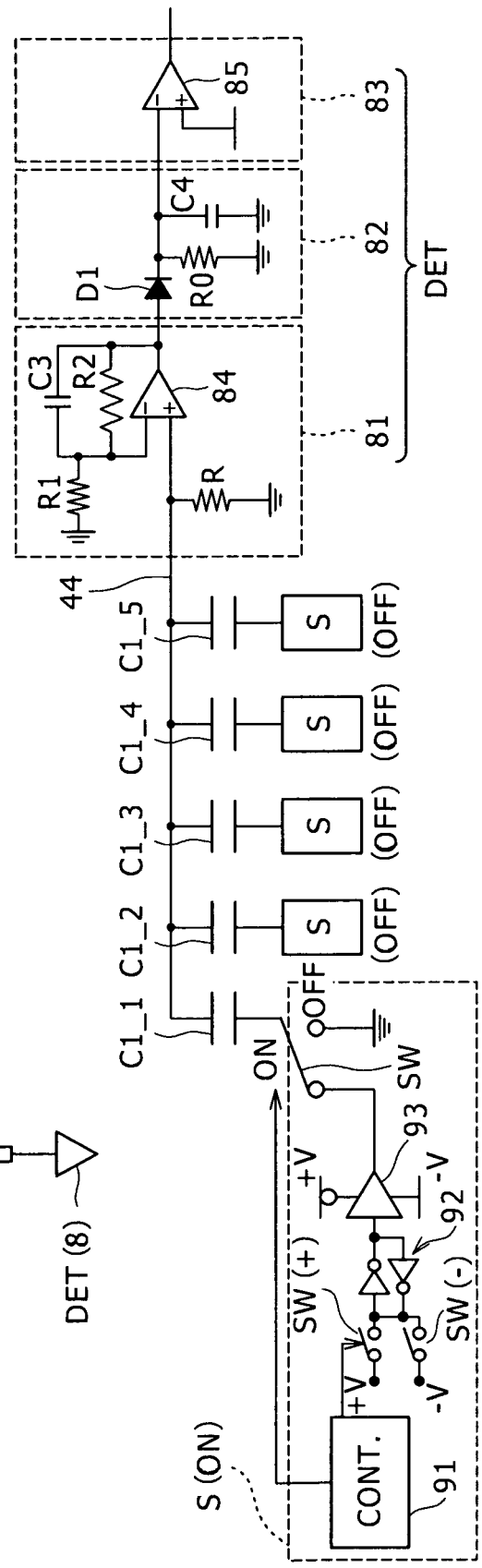
FIG. 6A
FIG. 6B

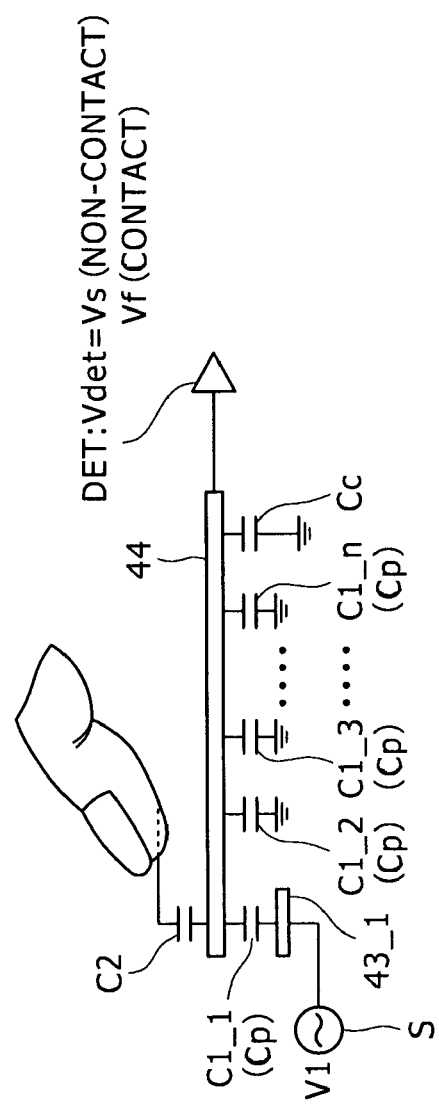
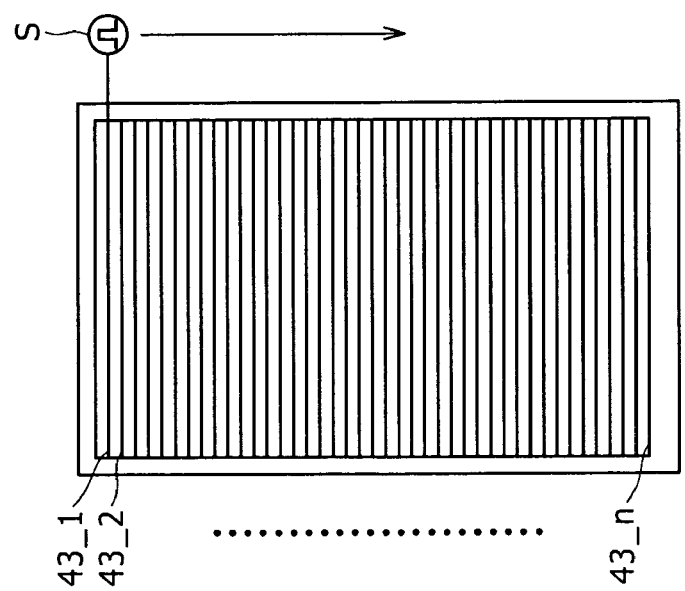
FIG.7B
FIG.7A

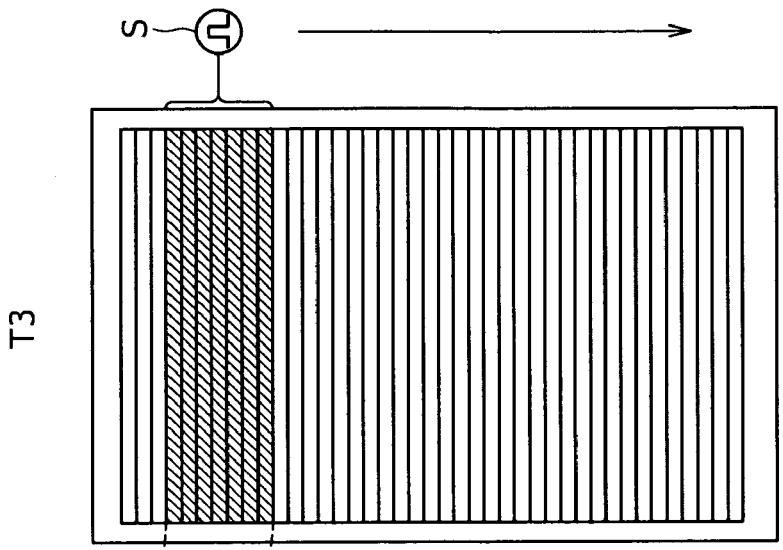
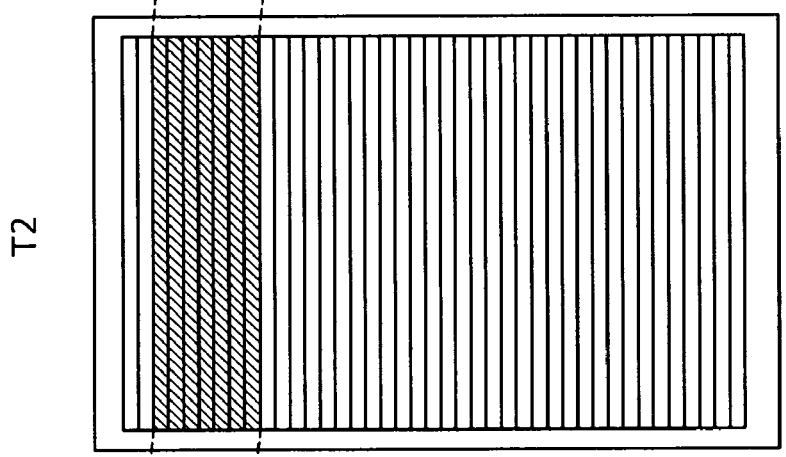
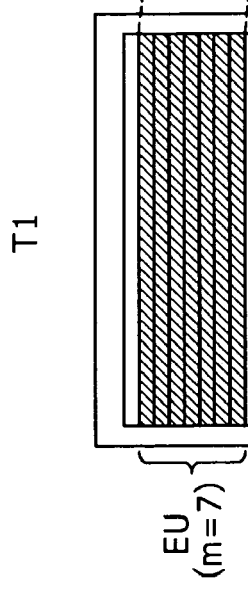

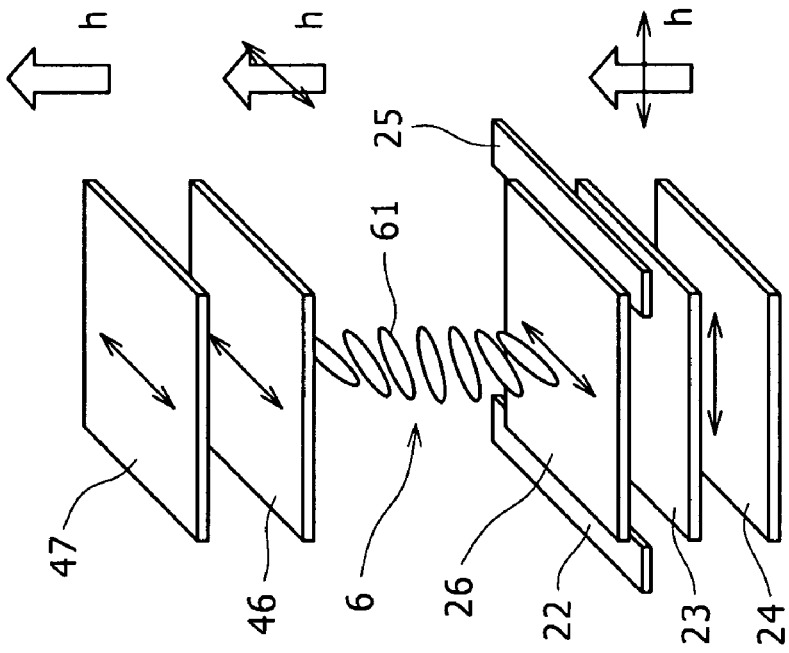
FIG.11A BLACK DISPLAY
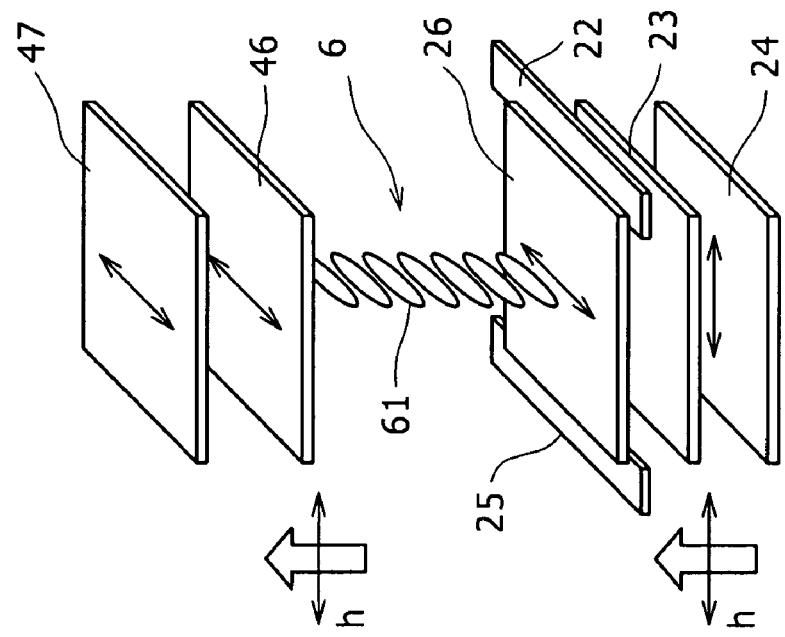
FIG.11B WHITE DISPLAY

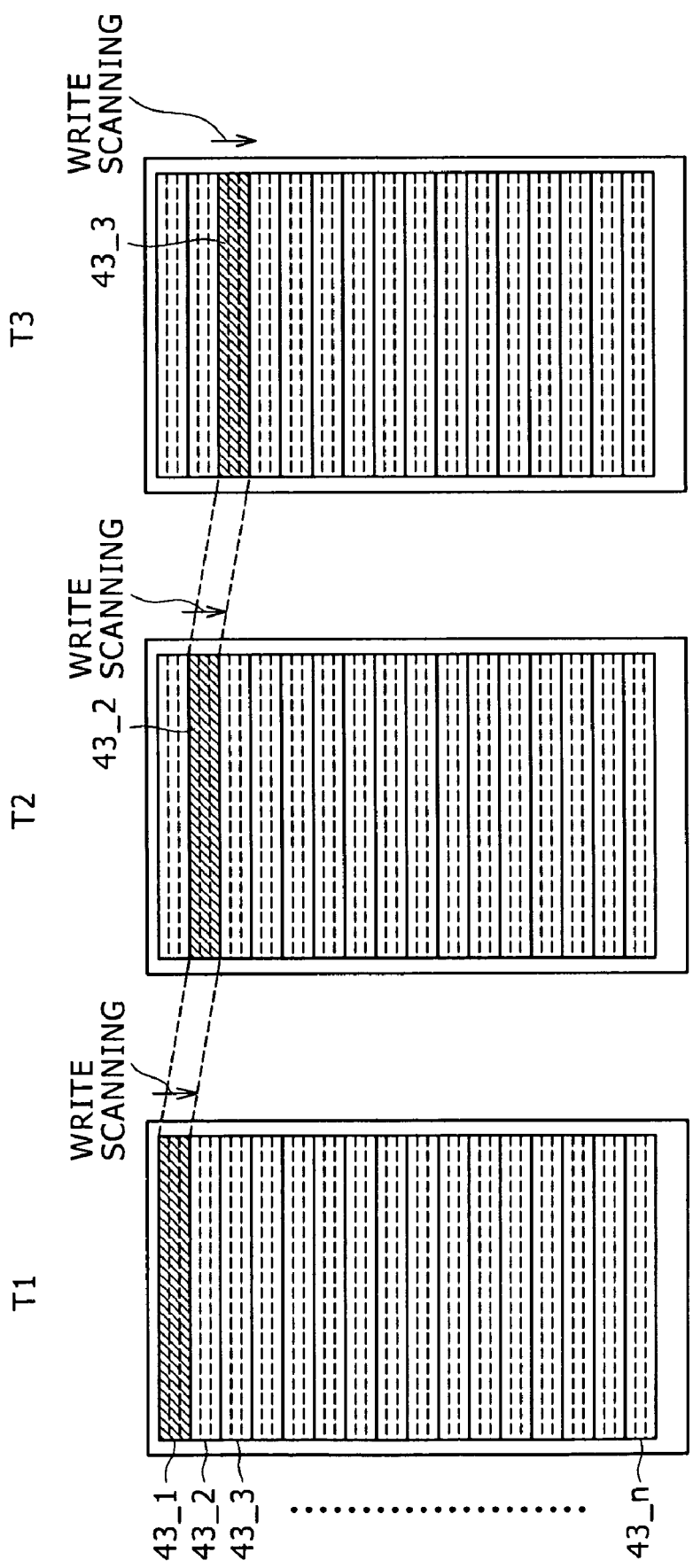

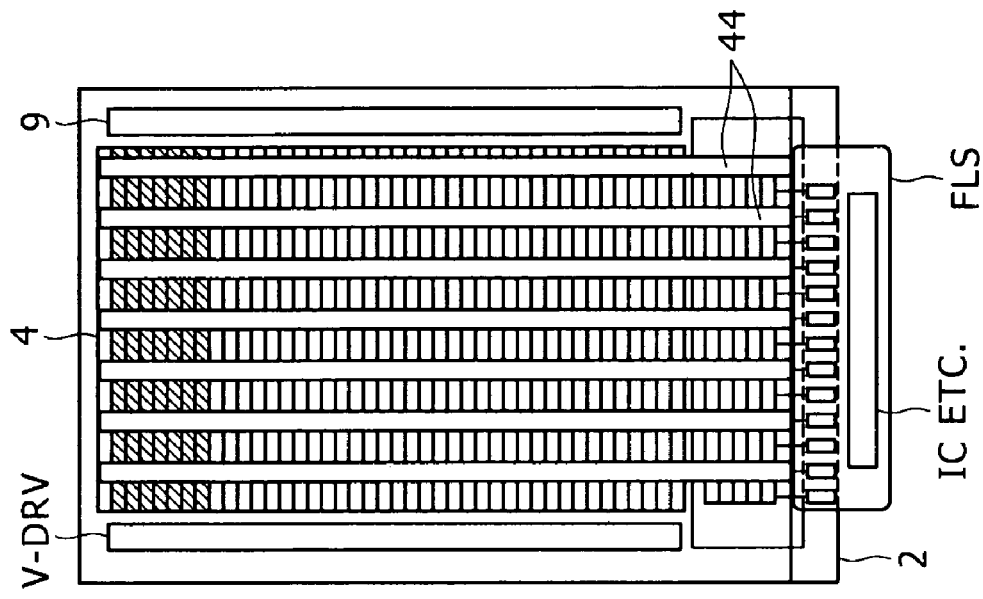
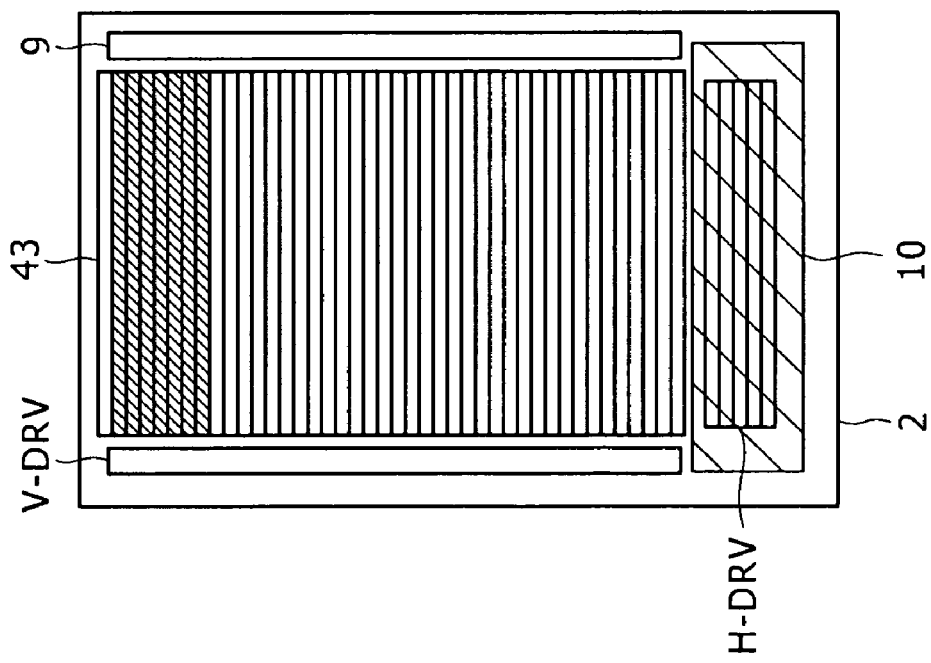

DISPLAY DEVICE AND A METHOD OF DRIVING THE SAME

BACKGROUND OF THE INVENTION

1. Field of the Invention

The present invention relates to a display device such as a liquid crystal display device, and a method of driving the same, and more particularly to a display device having an electrostatic capacitance type touch sensor which a user touches with his/her finger, thereby making it possible to input information, and a method of driving the same.

2. Description of the Related Art

There is known a liquid crystal display device with a contact detector called a so-called touch panel (hereinafter referred to as "a touch sensor"). In this liquid crystal display device, the touch sensor is formed so as to be stacked on a liquid crystal panel, and various kinds of buttons are displayed as images on a liquid crystal display surface. Thus, information can be inputted with the various kinds of buttons displayed as images instead of using normal mechanical buttons. When this technique is applied to a miniature mobile device, dispositions of a display and buttons can be commonized. As a result, there is provided a superior merit such as scaling-up of a screen, space saving of a manipulation portion, and reduction of the number of parts or components. However, when the touch panel is provided in the liquid crystal panel, an entire liquid module is thickened.

In order to cope with this situation, for example, Japanese Patent Laid-Open No. 2008-9750 proposes a liquid crystal display element with a touch panel. This liquid crystal display element with a touch panel is such that a conductive film for the touch panel is provided between an observation side substrate of the liquid crystal display element, and a polarizing plate for observation disposed on an outer surface of the observation side substrate, and an electrostatic capacitance type touch panel is formed between the conductive film for the touch panel, and the outer surface of the polarizing plate by using the outer surface of the polarizing plate as a touch surface. In this case, this liquid crystal element with the touch panel is thinned.

SUMMARY OF THE INVENTION

However, in the liquid crystal element with the touch panel disclosed in Japanese Patent Laid-Open No. 2008-9750, in principle, it is necessary that the conductive film for the touch panel is set at the same potential as that of a user. Thus, the user needs to be properly grounded. Therefore, setting aside the question of a stationary television receiver powered through a socket, it is difficult to realistically apply the liquid crystal element with the touch panel to an application of the mobile device. In addition, in the technique described above, since it is necessary for the conductive film for the touch panel to be very close to the finger of the user, it is impossible to dispose the conductive film for the touch panel, for example, in a deeper portion of the liquid crystal display element, and so forth. As a result, there is a limit to a disposition portion. That is to say, the degree of freedom of design is small. Moreover, a circuit portion such as a touch panel driving portion and a coordinate detecting portion have to be provided separately from a display driving circuit portion of the liquid crystal display element in terms of the configuration of the liquid crystal element with the touch panel. Thus, it is difficult to integrate the circuits in terms of the entire device.

In the light of the foregoing, it is therefore desirable to provide a display device which has a configuration allowing the display device to be thinned, and which carries out a driving operation adapted to this configuration, and a method of driving the same.

In order to attain the desire described above, according to an embodiment of the present invention, there is provided a display device including: a plurality of pixels disposed in a matrix; pixel electrodes provided so as to correspond to the plurality of pixels, respectively; n ($n \geqq 2$) counter electrodes which are disposed separately from one another in a scanning direction as one disposition direction of the plurality of pixels so as to face the pixel electrodes, respectively, and which extend in the other direction intersecting perpendicularly the scanning direction; a display functional layer having a function of displaying an image in accordance with voltages applied across the pixel electrodes and the n counter electrodes facing each other, respectively; a write drive scanning portion for repetitively carrying out an operation for writing signal voltages for display to a predetermined number of pixel electrodes disposed in the other direction, and a shifting operation for successively switching the predetermined number of pixel electrodes as objects of write of the signal voltages for display in the scanning direction; detection electrodes having respective electrostatic capacitances between the n counter electrodes and the detection electrodes; an A.C. (alternate current) drive scanning portion for A.C. driving s ($n > s \geqq 1$) counter electrodes of the n counter electrodes, and shifting the s counter electrodes along with the shifting operation carried out by the drive scanning portion; and a detecting portion for detecting a change in voltage for the A.C. drive caused in each of the detection electrodes due to an influence of an external capacitance.

According to the embodiment of the display device described above, the n counter electrodes are used for the display drive and are disposed separately from one another in one direction (scanning direction) so as to face the pixel electrodes. The n counter electrodes are at least A.C. driven in portions corresponding to the pixels for which the display drive is carried out, respectively. The signal voltages applied to the display functional layer are applied across the counter electrodes and the pixel electrodes, respectively. Thus, for example, a magnitude of the write voltage to the corresponding one of the pixel electrodes with the voltage of the corresponding one of the counter electrodes as a reference becomes a magnitude of the signal voltage. On the other hand, the electrostatic capacitances are formed between the n counter electrodes and the detection electrodes, respectively. Since the n counter electrodes are A.C. driven, the A.C. voltages are transmitted to the detection electrodes through the electrostatic capacitances, respectively. The detecting portion detects the A.C. voltage on the detection electrode side. In other words, the detecting portion detects that the voltage applied to the electrostatic capacitance is changed due to the A.C. voltage developed on the detection electrode side. The change in voltage applied to the electrostatic capacitance results from that an A.C. current for the A.C. drive is partially consumed in the external capacitance. That is to say, when the external capacitance formed by the finger or the like is equivalently connected to the detection electrode, the voltage applied to the electrostatic capacitance is changed, and the detecting portion detects this change in electrostatic capacitance.

The write drive scanning portion writes the voltages for regulating the signal voltages described above to the pixel electrodes, respectively, by using a predetermined number of pixel electrodes in the other direction intersecting perpendicularly the scanning direction as a unit. The predetermined number of pixel electrodes to which the voltages are written, respectively, at a time will be hereinafter referred to as "a write unit." The write drive scanning portion repetitively carries out the writing operation while successively shifting the write unit in the scanning direction. At this time, the A.C. drive scanning portion A.C. drives the voltages of the s (n>s≧1) counter electrodes which are limited from the n counter electrodes in the scanning direction. The conditions imposed on the s counter electrodes which are A.C. driven are to contain therein the counter electrodes facing a predetermined number of pixel electrodes (within the write unit) as the objects of write. Also, the A.C. drive scanning portion shifts the s counter electrodes which are to be A.C. driven along with the shift of the write unit so as to usually fulfill the above conditions.

In the embodiment of the present invention, preferably, the write drive scanning portion selects the continuous two or more s counter electrodes from the n counter electrodes, A.C. drives the continuous two or more s counter electrodes thus selected, and repetitively carries out the A.C. drive while shifting the objects of selection of the counter electrodes in the scanning direction. Also, the write drive scanning portion carries out the shifting operation so that the common one or more counter electrodes are contained in the objects of the selection with the continuous two A.C. driving operations while repetitively carrying out the A.C. drive.

In this case, the A.C. drive scanning portion carries out the A.C. driving operation while changing a combination (the objects of the selection) of two or more counter electrodes simultaneously driven. At this time, the A.C. drive scanning portion carries out the shifting operation so that the common one or more counter electrodes are contained in the objects of the selection with the continuous two A.C. driving operations. Therefore, a step of the shift of the group of counter electrodes which are being A.C. driven is smaller than that of the step of the shift of the group of counter electrodes which are being simultaneously A.C. driven. To put it the other way around, a width of the group of counter electrodes which are being simultaneously A.C. driven can be made large although the counter electrodes are finely shifted. Therefore, contradictory two operations, that is, the reducing of the step of the shift of the counter electrodes, and the reducing of the effective division number of counter electrodes are compatible with each other.

In the embodiment of the present invention, preferably, the n counter electrodes have a pitch length which is double or more a pitch length which the disposition of the pixel electrodes has in the scanning direction. Also, when the predetermined number of pixel electrodes is used as one write unit, the write drive scanning portion and the A.C. drive scanning portion carry out the write every write unit in the two or more write units facing the counter electrodes which are A.C. driven. After completion of the writing operation for the two or more write units, the write drive scanning portion and the A.C. drive scanning portion switch the objects of the A.C. drive over to other counter electrodes adjacent thereto, and carry out the write every write unit in the other two or more write units facing the other counter electrodes, respectively.

According to another embodiment of the present invention, there is provided a method of driving a display device, including the steps of: controlling voltages applied across a plurality of pixel electrodes provided so as to correspond to pixels, disposed in a matrix, respectively, and n (n≧2) counter electrodes disposed separately from one another in a scanning direction as one disposition direction of the plurality of pixel electrodes so as to face the plurality of pixel electrodes, respectively, thereby expressing gradations of an image; and detecting changes in outputs, caused by influences of external capacitances, from detection electrodes having electrostatic capacitors formed between the n counter electrodes and the detection electrodes, respectively; the first step including the steps of: repetitively carrying out an operation for writing signal voltages for display to a predetermined number of pixel electrodes disposed in the other direction intersecting perpendicularly the scanning direction, and shifting operation for successively switching the predetermined number of pixel electrodes as objects of write in the scanning direction; and A.C. driving s (n>s≧1) counter electrodes of the n counter electrodes, and shifting the s counter electrodes in the scanning direction along with the shifting operation; in which in the second step, the changes in outputs based on the A.C. drive for the counter electrodes are detected.

In the another embodiment of the present invention, preferably, in the write drive step in the first step, the two or more s counter electrodes are selected from the n counter electrodes, the two or more s counter electrodes thus selected are A.C. driven, and the A.C. drive is repetitively carried out while the objects of the selection of the counter electrodes are shifted in the scanning direction. Also, the shifting operation is carried out so that the common one or more counter electrodes are contained in the objects of the selection with the continuous two A.C. driving operations while the A.C. drive is repetitively carried out. Or, preferably, in the write drive step and the A.C. driving step in the first step, in the case where the n counter electrodes have a pitch length which is double or more a pitch length which the disposition of the pixel electrodes has in the scanning direction, when the predetermined number of pixel electrodes is used as one write unit, in the two or more write units facing the counter electrodes which are being A.C. driven, the write is carried out every write unit. Also, after completion of the writing operation for the two or more write units, the objects of the A.C. drive are switched over to other counter electrodes adjacent thereto, and in other two or more write units facing the other counter electrodes, the write is carried out every write unit.

According to the embodiments of the present invention, it is possible to provide the display device which has the configuration allowing the display device to be thinned, and which carries out the driving operation adapted to the configuration, and the method of driving the same.

BRIEF DESCRIPTION OF THE DRAWINGS

FIGS. 3A to 3C are respectively waveform charts showing waveforms of input/output waveforms obtained in the touch sensor portion shown in FIGS. 1A and 1B;

FIGS. 4A to 4C, and 4D are respectively top plan views, and a schematic cross sectional view specialized in a disposition of electrodes for touch detection, and a circuit for drive for the same electrodes or detection in a display device according to a first embodiment of the present invention;

FIGS. 6A and 6B are respectively a top plan view of electrode patterns adapted to show a position as an object of detection, and a circuit diagram showing a configuration of a detecting circuit for carrying out a touch detecting operation;

FIGS. 7A and 7B are respectively a top plan view showing patterns of counter electrodes, and an equivalent circuit diagram of the touch sensor portion including the patterns of the counter electrodes in the display device according to the first embodiment of the present invention;

FIGS. 8A, 8B and 8C are respectively top plan views showing a situation of selection of the counter electrodes (decision of a group of electrodes to be simultaneously A.C. driven), and shift (resolution) thereof in the display device according to the first embodiment of the present invention;

FIGS. 11A and 11B are respectively schematic perspective views each explaining an operation of an FFS mode liquid crystal element in the display device according to the second embodiment of the present invention;

FIGS. 14A, 14B and 14C are respectively top plan views explaining a method of A.C. driving a display device according to a third embodiment of the present invention;

FIGS. 15A and 15B are respectively top plan views showing a panel structure of a display device according to a fourth embodiment of the present invention.

DETAILED DESCRIPTION OF THE PREFERRED EMBODIMENTS

Figure 1B:
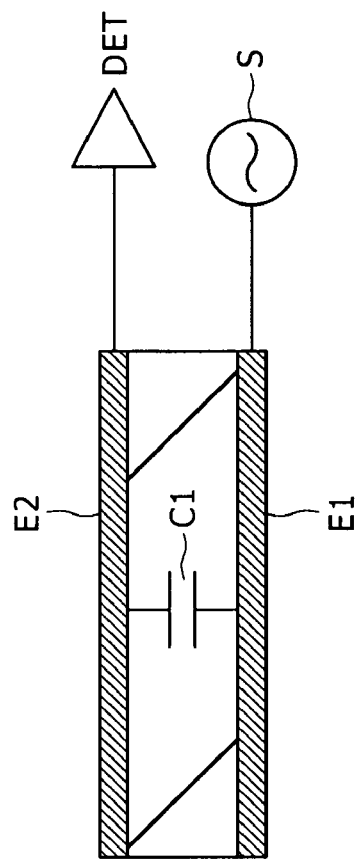
FIGS. 1A and 1B are respectively an equivalent circuit diagram and a schematic cross sectional view each explaining an operation of a touch sensor portion according to an example in a display device of the present invention.

In an example in a display device of the present invention, one electrode which is provided inside a panel with respect to a detection electrode (an electrode which a finger or the like approaches on a display surface side) of a touch sensor is used as an electrode as well for liquid crystal control. In this case, an electrostatic capacitance to be detected is formed between the detection electrode and the one electrode. Since the one electrode is preferably provided so as to face both the detection electrode and a pixel electrode, the one electrode will be hereinafter simply referred to as "a counter electrode."

On the other hand, with regard to the electrode for the liquid crystal control, in order to apply an electric field to a display functional layer such as a liquid crystal layer, a common electrode (a so-called $V_{com}$ drive electrode) which is provided commonly to a plurality of pixels is used so as to face the pixel electrode for each pixel. In the liquid crystal display control, a common voltage applied to the common electrode is a voltage as a reference for a signal voltage. In the well-known low power consumption drive, the common electrode is A.C. pulse-driven as a method of approximately reducing an absolute value of a voltage used by half. In the example in the display device of the present invention, for example, a common voltage which is A.C. driven, for example, A.C. pulse-driven for the purpose of controlling the liquid crystal or the like is utilized as a drive voltage as well for the touch sensor. Expressed in another way, the counter electrode of the touch sensor described above and the common electrode of the liquid crystal device are shared.

Here, of course, the A.C. drive for the counter electrode has to be adapted to the $V_{com}$ drive, and thus this is a request for display drive (first request).

In addition, preferably, the touch sensor not merely simply detects that a finger or the like either approaches or contacts the display surface of a display device, but also detects a manipulation position of the finger or the like within the display surface. In order to detect which of buttons is manipulated when, for example, images of a plurality of buttons are displayed, an electrode (counter electrode) serving both as the common electrode for display drive and an electrode for supply of a drive electric power for the touch sensor is divided into a plurality of parts. The reason for this is because the manipulation position is detected based on which of the counter electrodes a change in electrostatic capacitance occurs in without an obstacle to the drive for display pixel lines. More specifically, merely the counter electrodes obtained through the division are A.C. pulse-driven which are located in an area containing the pixel lines as objects of scanning for display drive. Also, along with the scanning for the pixel lines, the counter electrodes to be A.C. pulse-driven are moved (scanned) with the movement of the area containing the pixel lines which are being scanned. During the scanning, the change in electrostatic capacitance is monitored, and thus the manipulation position of the finger or the like can be identified based on the position of the counter electrode having the largest change in electrostatic capacitance. The above is a request for detection of the position of the touch sensor when the common electrode for the display control, and the sensor driving electrode are shared (second request).

Moreover, when the electrode drive for the touch sensor is carried out for a part within the screen in order to fulfill the second request described above, there is the possibility that the following inconvenience occurs. When the pixel line nearest the end of the counter electrode is displayed, and the scanning proceeds to a next pixel line, an operation for switching the A.C. pulse drive for the counter electrode over to the A.C. pulse drive for the adjacent counter electrode side is also carried out along with the proceeding of the scanning. For this reason, a fine change in drive voltage exerts an influence on the display of the pixel line. That is to say, it is feared for the entire display screen that a boundary between the counter electrodes slightly appears as a line.

On the other hand, when the original counter electrode are finely partitioned so as to correspond to the pixel lines, the counter electrode to be A.C. pulse-driven obtained through the partition is also switched over to another one every display drive made every pixel line. At this time, the line of the boundary hardly appears because the conditions for the switching of the A.C. pulse drive for the counter electrode are equal to one another even for any of the pixel lines. In addition, a switching frequency for the pixel electrode is close to a drive frequency of the common voltage. For this reason, when the counter electrode is provided every pixel line, even if there is a fine voltage in drive voltage, this change is hardly seen by an eye of the human being.

Moreover, when the original counter electrode is also finely partitioned, a high resolution in a column direction is obtained in terms of the touch sensor. However, it is unnecessary to obtain the high resolution so much because it is normal that an object to be detected such as a finger is larger in size than the pixel line. In addition, above all, when the original counter electrode is also finely partitioned so as to correspond to the pixel lines, respectively, a voltage (sensor voltage $V_s$) obtained by transmitting the common voltage of the common electrode to the detection electrode through the electrostatic capacitance becomes small. As a result, an S/N ratio is reduced due to an influence of noises. From the above, when for the position detection in the touch sensor, the original counter electrode is divided into parts, and the resulting parts are successively driven, there is shown a trade-off relationship in which the fact that the line at which the counter electrode as an object of the drive is switched over to another one is seen, thereby reducing the image quality, and the ensuring of the magnitude of the sensor voltage $V_s$ (the ensuring of the S/N ratio) are contradicted. The demining or alleviation of this trade-off relationship is a third request desired when the sensor driving electrode, and the common electrode for the display driving are shared.

Each of four embodiments which will be described below includes a structure of a counter electrode, and a method of driving the counter electrode for fulfilling one or more of the first to third requests described above. Hereinafter, the four embodiments of the present invention will be described in detail with reference to the accompanying drawings.

Figure 1A:
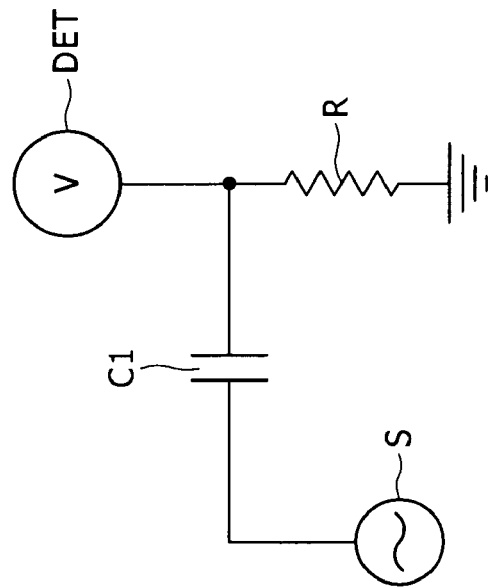
Figure 2B:
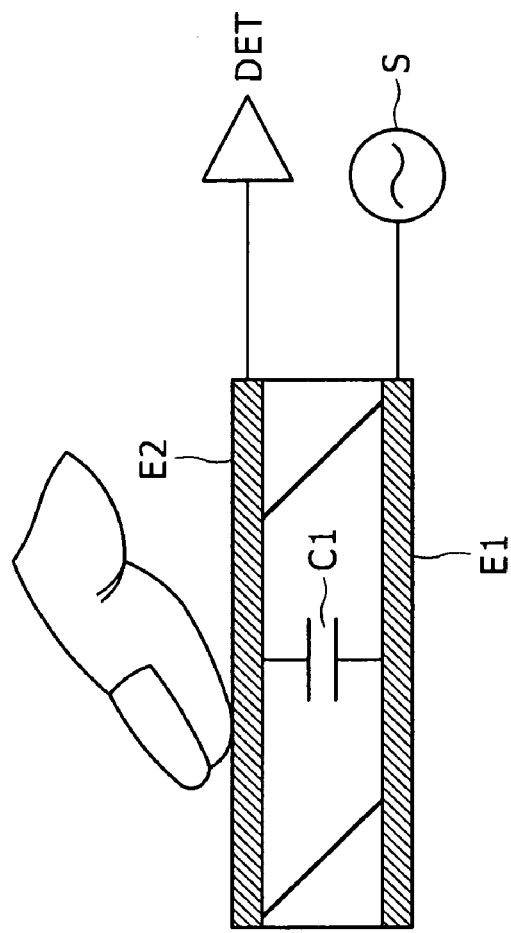
FIGS. 2A and 2B are respectively an equivalent circuit diagram and a schematic cross sectional view when a finger either contacts or approaches the touch sensor portion shown in FIGS. 1A and 1B.
Figure 2A:
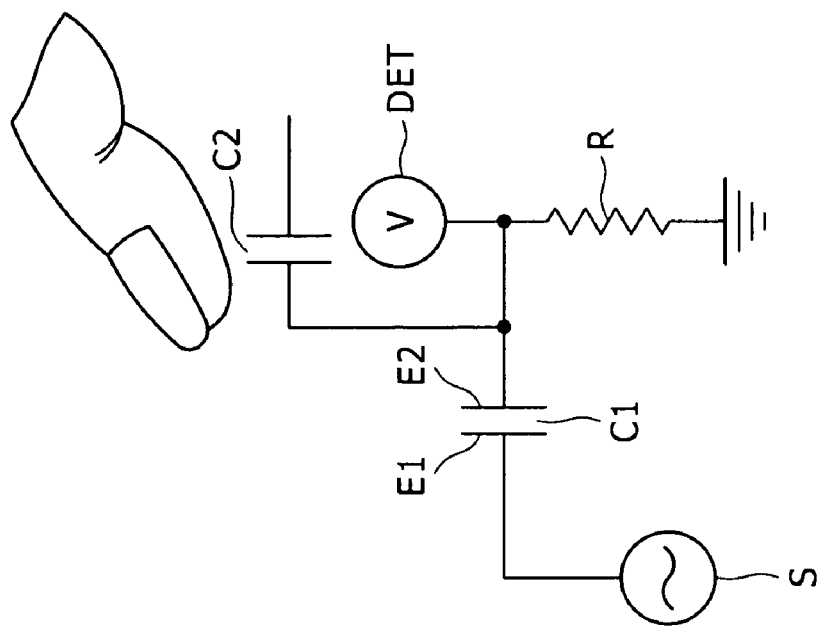

Firstly, a basis of the touch detection of an example in the display device of the present invention will be described as an item common to the four embodiments with reference to FIGS. 1A and 1B, FIGS. 2A and 2B, and FIGS. 3A to 3C. FIG. 1A and FIG. 2A are respectively equivalent circuit diagrams of a touch sensor portion, and FIG. 1B and FIG. 2B are respectively structural views (schematic cross sectional views) of the touch sensor portions. Here, FIGS. 1A and 1B show the case where a finger as an object to be detected does not approach a touch sensor, and FIGS. 2A and 2B show the case where the finger as the object to be detected either approaches or contacts the touch sensor.

The touch sensor portion illustrated in these figures is an electrostatic capacitance type touch sensor, and is composed of a capacitative element as shown in FIG. 1B and FIG. 2B. Specifically, the capacitative element (having an electrostatic capacitance) C1 is composed of a dielectric D, a pair of electrodes disposed so as to face each other and so as to hold the dielectric D between the electrodes, that is, a drive electrode E1 and a detection electrode E2. As shown in FIG. 1A and FIG. 2A, the drive electrode E1 of the capacitative element C1 is connected to an A.C. signal source S for generating an A.C. pulse signal $S_g$, and the detection electrode E2 thereof is connected to a voltage detector DET. At this time, the detection electrode E2 is grounded through a resistor R, thereby electrically fixing a D.C. level.

The A.C. pulse signal $S_g$ having a predetermined frequency, for example, about several kHz to about a dozen kHz is applied from the A.C. signal source S to the drive electrode E1. A waveform chart of the A.C. pulse signal $S_g$ is exemplified in FIG. 3B. In this case, an output waveform (of a detection signal $V_{det}$) as shown in FIG. 3A appears in the detection electrode E2. It is noted that although details will be described later, in the embodiment of the present invention, the drive electrode E1 corresponds to a counter electrode (an electrode, common to a plurality of pixels, facing pixel electrodes) for liquid crystal driving in the example in the display device of the present invention. Here, for the liquid crystal drive, an A.C. drive called a $V_{com}$ inversion drive is carried out for the counter electrode. Therefore, in the example in the display device of the present invention, a common drive signal $V_{com}$ for the $V_{com}$ inversion drive is used as the A.C. pulse signal $S_g$ as well in accordance with which the drive electrode E1 is driven for the touch sensor.

In the state, shown in FIGS. 1A and 1B, in which the finger does not contact the touch sensor, the drive electrode E1 of the capacitative element C1 is A.C. driven, so that an A.C. detection signal $V_{det}$ appears in the detection electrode E2 along with the charge/discharge of the capacitative element C1. Hereinafter, the detection signal at this time will be described as "an initial detection signal $V_{det0}$." Although the detection electrode E2 side is D.C. grounded, it is not grounded in terms of high frequencies. As a result, there is no A.C. discharge path, and thus a pulse crest value of the initial detection signal $V_{det0}$ is relatively large. However, when time elapses after rising of the A.C. pulse signal $S_g$, the pulse crest value of the initial detection signal $V_{det0}$ gradually decreases due to a loss. FIG. 3C shows an enlarged waveform together with a scale. The pulse crest value of the initial detection signal $V_{det0}$ decreases from 2.8 V as an initial value by about 0.5 V after a lapse of slight time due to the high frequency loss.

When the finger either contacts or approaches the detection electrode E2 within easy reach, of the detection electrode E2, exerting an influence on the detection electrode E2 from this initial state, as shown in FIG. 2A, a circuit state is changed to a state equivalent of the case where the capacitor C2 is connected to the detection electrode E2. The reason for this is because the human body becomes equivalent of the capacitor having one side grounded in terms of the high frequencies. In this contact state, the discharge path of the A.C. signal through the capacitative element C1 and the capacitor C2 is formed. Thus, A.C. currents I1 and I2 are caused to flow through the capacitative element C1 and the capacitor C2 along with the charge/discharge of the capacitative element C1 and the capacitor C2, respectively. For this reason, the voltage of the initial detection signal $V_{det0}$ is divided into values depending on a ratio or the like between capacitance values of the capacitative element C1 and the capacitor C2.

A detection signal $V_{det1}$ shown in FIGS. 3A and 3C is a detection signal which appears in the detection electrode E2 when the finger contacts the detection electrode E2. It is understood from FIG. 3C that a decrease amount of detection signal is in the range of about 0.5 to about 0.8 V. A voltage detector DET shown in FIGS. 1A and 1B, and FIGS. 2A and 2B detects the decrease of the detection signal by, for example, using a threshold voltage $V_{th}$, thereby detecting that the finger contacts the detection electrode E2.

Hereinafter, the first to fourth embodiments of the present invention will be described in detail based on a structure and an operation of the display device with reference to the accompanying drawings.

First Embodiment

Figure 5:
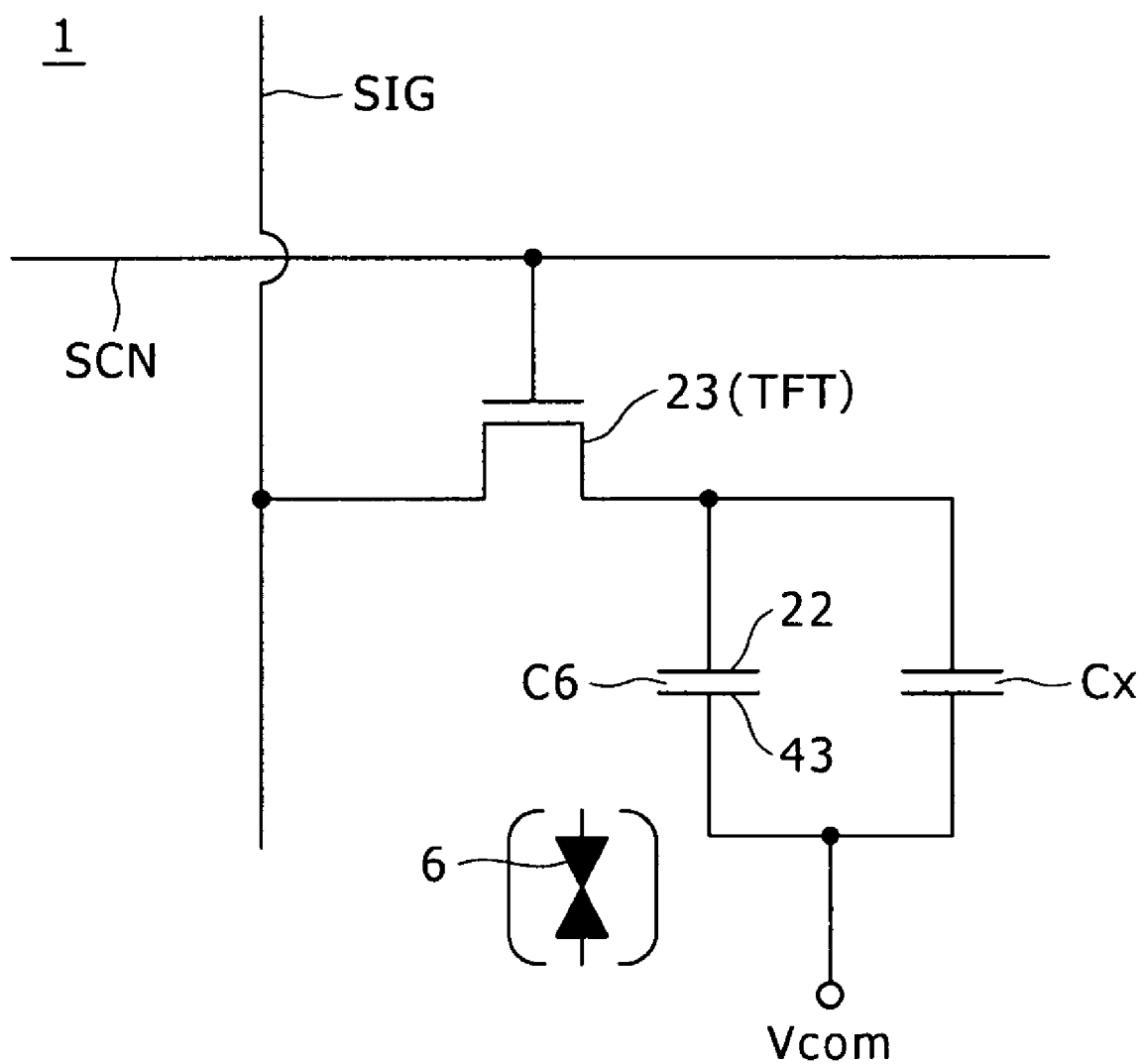
FIG. 5 is an equivalent circuit diagram of a pixel in the display device according to the first embodiment of the present invention.

FIGS. 4A to 4C respectively show top plan views specialized in dispositions of electrodes, and a circuit or driving or detecting the electrode in the display device according to the first embodiment. Also, FIG. 4D shows a schematic cross sectional view of a structure of the display device according to the first embodiment. FIG. 4D shows a cross section for six pixels, for example, in a row direction (in a pixel display line direction). FIG. 5 is an equivalent circuit diagram of a pixel. The display device illustrated in FIGS. 4A to 4D is a liquid crystal display device including a liquid crystal layer as "a display functional layer."

The liquid crystal display device 1, as previously stated, has an electrode (counter electrode). In this case, this counter electrode is a common electrode, common to a plurality of pixels, of two electrodes facing to each other so as to hold the liquid crystal layer between them. Also, a common drive signal $V_{com}$ giving a signal voltage for gradation display a reference voltage every pixel is applied to the counter electrode concerned. In the first embodiment of the present invention, the counter electrode is used as an electrode as well for sensor drive. In FIG. 4D, in order to make the cross sectional structure more visible, the counter electrode, a pixel electrode and a detection electrode as main constituent elements of the embodiments of the present invention are each given hatching. However, the hatching is omitted for each of portions such as a substrate, an insulating film and a functional film other than the counter electrode, the pixel electrode and the detection electrode. Omission of the hatching also applies to any of other cross sectional structure views in and after FIGS. 4A to 4D.

In the liquid crystal display device 1, the pixels PIX each shown in FIG. 5 are disposed in a matrix. Each of the pixels PIX, as shown in FIG. 5, has a Thin Film Transistor (TFT) 23 (hereinafter described as "a TFT 23") as a selection element for the pixel, an equivalent capacitance C6 of the liquid crystal layer 6, and a hold capacitor (referred to "an additional capacitor" as well) $C_x$. An electrode on one side of the equivalent capacitance C6 expressing the liquid crystal layer 6 is a pixel electrode 22. In this case, the original pixel electrode is divided into parts so as to correspond to the pixels, respectively, and the parts, that is, the pixel electrodes 22 are disposed in a matrix. On the other hand, an electrode on the other side of the equivalent capacitance C6 is a counter electrode 43 common to a plurality of pixels.

The pixel electrode 22 is connected to one of a source and a drain of the TFT 23, and a signal line SIG is connected to the other of the source and the drain of the TFT 23. The signal line SIG is connected to a vertical driving circuit (not shown) (refer to FIGS. 14A to 14C concerned with a third embodiment which will be described later), and a video signal having a signal voltage is supplied from the vertical driving circuit to the signal line SIG. The counter electrode 43 is given the common drive signal $V_{com}$. The common drive signal $V_{com}$ is a signal which is obtained by inverting positive and negative potentials every one horizontal time period (1 H) with a central potential as a reference. A gate of the TFT 23 is made electrically common to all the pixels PIX arranged in a row direction, that is, a transverse direction of a display screen, thereby forming a scanning line SCN. A gate pulse which is outputted from the vertical driving circuit (not shown) in order to open/close the gate of the TFT 23 is supplied to the scanning line SCN. For this reason, the scanning line SCN is referred to as a gate line as well.

As shown in FIG. 5, the hold capacitor $C_x$ is connected in parallel with the equivalent capacitance C6. The hold capacitor $C_x$ is provided for the purpose of preventing a write potential from being reduced due to a leakage current or the like of the TFT 23 caused by insufficiency of a storage capacitance in the equivalent capacitance C6. In addition, the addition of the hold capacitor $C_x$ is also useful in prevention of flicker and an improvement in uniformity of a picture luminance.

The liquid crystal display device 1 having such pixels disposed therein includes a substrate 2 (hereinafter referred to as "a drive substrate 2"), a counter substrate 4 disposed so as to face the drive substrate 2, and the liquid crystal layer 6 disposed between the drive substrate 2 and the counter substrate 4. In this case, the TFTs 23 each shown in FIG. 5 are formed in a portion of the drive substrate 2 not appearing in the cross section when viewed from the cross sectional structure (refer to FIG. 4D), and drive signals (signal voltages) for the respective pixels are supplied to the drive substrate 2.

The drive substrate 2 has a TFT substrate 21 (a substrate body portion thereof is made of a glass or the like) as a circuit substrate having the TFTs 23 each shown in FIG. 5 formed thereon, and a plurality of pixel electrodes 22 which are disposed in a matrix on the TFT substrate 21. A display driver (a vertical driving circuit, a horizontal driving circuit and the like) (not shown) for driving pixel electrodes 22 is formed on the TFT substrate 21. In addition, the TFTs 23 each shown in FIG. 5, and wirings such as the signal line SIG and the scanning line SCN are formed on the TFT substrate 21. A detecting circuit (refer to FIGS. 6A and 6B) for carrying out a touch detecting operation which will be described later may be formed on the TFT substrate 21.

The counter substrate 4 has a glass substrate 41, a color filter 42 formed on one surface of the glass substrate 41, and a counter electrode 43 formed on the color filter 42 (on the liquid crystal layer 6 side). The color filter 42 is structured by periodically disposing three color filter layers of, for example, Red (R), Green (G) and Blue (B). In this case, the three colors of R, G and B are made to correspond to each of the pixels PIX (each of the pixel electrodes 22). It is noted that although the pixel to which one of R, G and B is made to correspond is called a sub-pixel, and the sub-pixels to which the three colors R, G and B are made correspond, respectively, are collectively called the pixel in some cases, the sub-pixel is also described as the pixel PIX herein. The counter electrode 43 is used as a sensor driving electrode as well composing a part of the touch sensor for carrying out the touch detecting operation, and corresponds to the drive electrode E1 shown in FIGS. 1A and 1B, and FIGS. 2A and 2B.

The counter electrode 43 is coupled to the TFT substrate 21 by using a contact conductive column 7. Also, a common drive signal $V_{com}$ having an A.C. pulse waveform is applied from the TFT substrate 21 to the counter electrode 43 through the contact conductive column 7. This common drive signal $V_{com}$ corresponds to the A.C. pulse signal $S_g$ supplied from the drive signal source S shown in FIGS. 1A and 1B, and FIGS. 2A and 2B.

A detection electrode 44 is formed on the other surface of the glass substrate 41 (on the display surface side), and a protective layer 45 is further formed on the detection electrode 44. The detection electrode 44 composes a part of the touch sensor, and corresponds to the detection electrode E2 shown in FIGS. 1A and 1B, and FIGS. 2A and 2B. A detecting circuit (refer to FIGS. 6A and 6B) for carrying out the touch detecting operation which will be described later may be formed on the glass substrate 41.

The liquid crystal layer 6 modulates, as "the display functional layer," a light being transmitted through the liquid crystal layer 6 in a thickness direction thereof (a facing direction of the electrodes 22 and 43) in accordance with a state of an electric field applied across the liquid crystal layer 6. A liquid crystal material having any of various modes such as twisted nematic (TN), a vertical alignment (VA) or electric-control birefringence (ECB) is used for the liquid crystal layer 6.

Alignment films are disposed between the liquid crystal layer 6 and the drive substrate 2, and between the liquid crystal layer 6 and the counter substrate 4, respectively. In addition, polarizing plates are disposed on a non-display surface side (that is, a back surface side) of the drive substrate 2, and on a display surface side of the counter substrate 4, respectively. These optical functional layers are omitted in their illustrations in FIGS. 4A and 4D for the sake of simplicity.

The original counter electrode 43, as shown in FIG. 4A, is divided into parts in a row or column direction of the pixel disposition, that is, in the column direction (in a longitudinal direction in FIG. 4A) in the first embodiment. The direction of the division corresponds to a scanning direction of pixel lines in the display drive, that is, a direction along which the vertical driving circuit (not shown) successively activates the scanning lines SCN. The original counter electrode 43 is divided into n parts in total. Therefore, the resulting counter electrodes 43_1, 43_2, 43_3, . . . , 43_m, . . . , 43_n are disposed in a plane-like shape so as to have a long strip-shaped pattern in the row direction, and are bedded in parallel with one another at mutual separate distances within the plane concerned.

At least two or more m (<n) counter electrodes of the counter electrodes 43_1 to 43_n obtained through the n-division are simultaneously driven. That is to say, the common drive signal $V_{com}$ is applied simultaneously to the m counter electrodes 43_1 to 43_m, and the inversion of the potential thereof is repetitively carried out every one horizontal time period (1 H). At this time, other counter electrodes are not changed in their potentials because no drive signal is given thereto. In the first embodiment of the present invention, a batch of the counter electrodes simultaneously driven is described as an A.C. drive electrode circuit EU. In the first embodiment of the present invention, the number of counter electrodes is set as a given number, m, every A.C. drive electrode circuit EU. In addition, the A.C. drive electrode circuit EU is shifted in a step-like shape in the column direction while a combination of the counter electrodes tied together is changed. That is to say, the combination of the counter electrodes selected as the A.C. drive electrode circuit EU is changed every shift. Also, in one shift, one counter electrode obtained through the division becomes out of the selection, and another one counter electrode obtained through the division is newly selected in the A.C. drive electrode circuit EU instead.

Putting this shifting operation into other words, "the n counter electrodes 43_1 to 43_n are disposed at equal intervals in the column direction by the same number as that of pixel electrodes 22 (that is, by the number of pixels), and when the $V_{com}$ A.C. drive is repetitively carried out, the combination of the m (<n) counter electrodes selected as one A.C. drive electrode unit EU is shifted in the column direction by using the pitch at which the counter electrodes 43_1 to 43_n are disposed in the column direction as a unit." Here, "the pitch of the counter electrodes" means a distance obtained by summing up a width of the counter electrodes in the column direction, and a separate distance to another counter electrode adjacent to one side of these counter electrodes in a width direction. Normally, the pitch of the counter electrodes in the column direction is equal to a pixel size in the column direction.

Such a $V_{com}$ A.C. driving operation using the A.C. drive electrode unit EU of the counter electrodes as the unit, and the shifting operation for shifting the A.C. drive electrode unit EU are carried out by a $V_{com}$ driving circuit 9, as "an A.C. drive scanning portion," which is provided within a vertical driving circuit (write drive scanning portion) (not shown). The operation of the $V_{com}$ driving circuit 9 is regarded as being equal to "an operation for moving the A.C. signal source S (refer to FIGS. 1A and 1B, and FIGS. 2A and 2B) for simultaneously Vcom A.C. driving wirings for the m counter electrodes in the column direction, and scanning the counter electrodes in the column direction while the counter electrodes selected are changed one by one."

On the other hand, the detection electrode 44 is composed of a plurality of strip-shaped electrode patterns (detection electrodes 44_1 to 44_k) extending in a direction along which the electrode patterns (the counter electrodes 43_1 to 43_n) of the counter electrodes 43 are separately formed. Detection signals $V_{det}$ are outputted from the k detection electrodes 44_1 to 44_k, respectively. These k detection signals $V_{det}$ are inputted to a detecting circuit 8, as "a detecting portion," using the voltage detector DET shown in FIGS. 1A and 1B, and FIGS. 2A and 2B as a basic detection unit.

It is noted that although FIG. 4A and FIG. 4B are separately drawn for explanation of the electrode patterns, actually, as shown in FIG. 4C, the detection electrodes 44_1 to 44_k are disposed so as to be located above the counter electrodes 43_1 to 43_n, thereby making it possible to detect the position within the two-dimensional plane. With this structure, the detecting circuit 8 can detect the position in the row direction depending on which of the voltage detectors DET a change in voltage occurs, and can obtain the positional information in the column direction at the timing in the phase of detection of the position in the column direction. In other words, the $V_{com}$ driving operation of the $V_{com}$ drive circuit 9, and the operation of the detecting circuit 8, for example, are synchronized with each other in accordance with a clock signal having a predetermined period. With such a synchronous operation, it is found out which of the times when the $V_{com}$ driving circuit 9 drives which of the counter electrodes separately formed the time when the detecting circuit 8 obtains the change in voltage corresponds to. As a result, it is possible to detect the center of the position where the finger contacts the corresponding one of the detection electrodes 44_1 to 44_k. Such a detecting operation is controlled by a computer-based overall control unit (not shown) for controlling the entire liquid crystal display device 1, for example, a CPU or a microcomputer, or a control circuit for touch detection.

FIGS. 6A and 6B are respectively a top plan view of the electrode patterns adapted to show a position as an object of detection, and a circuit diagram showing a configuration of the detecting circuit 8 for carrying out the touch detecting operation. As shown in FIG. 6A, the counter electrode 43_1 having slant lines is connected to an A.C. signal source S to be selected, and the counter electrodes 43_2 to 43_5 other than the counter electrode 43_1 are each held at the GND potential which gives a central potential for the $V_{com}$ inversion driving. A state in which the counter electrode 43_1 is selected is called an ON state as well, and in a non-selection state is called an OFF state as well. FIG. 6B shows a circuit diagram of the voltage detector DET which either intersects the group of counter electrodes 43_1 to 43_5, or is connected to the detection electrode 44, and the A.C. signal source S. Electrostatic capacitative elements C1_1 to C1_5 are formed in intersection portions between the detection electrode 44, and the counter electrodes 43_1 to 43_5, respectively. It is noted that in the first embodiment, actually, as previously stated, the m counter electrodes composing the A.C. drive electrode unit EU are simultaneously A.C. driven. Therefore, one counter electrode (for example, the counter electrode 43_1) shown in FIG. 6A may be regarded as corresponding to the A.C. drive electrode unit EU.

The A.C. signal source S illustrated in FIG. 6B has a control portion 91, two switches SW(+) and SW(−), a latch circuit 92, a buffer circuit (waveform shaping portion) 93, and an output switch SW. The control circuit 91 is a circuit for controlling the two switches SW(+) and SW(−) for switching a plus voltage V(+) and a minus voltage V(−). Even when the control portion 91 is not provided within the A.C. signal source S, an external CPU or the like can be substituted for the control portion 91. The switch SW(+) is connected between a terminal set at the plus voltage V(+) and an input terminal of the latch circuit 92, and the switch SW(−) is connected between a terminal set at the minus voltage V(−) and the input terminal of the latch circuit 92. An output terminal of the latch circuit 92 is connected to an ON side node of the output switch SW through the buffer circuit 92. The buffer circuit 93 is a circuit for outputting potentials obtained by compensating for an input potential to the terminals set at the plus voltage V(+) and the minus voltage V(−), respectively. Here, the output switch SW is controlled by the control portion 91 so as to control whether the A.C. signal source S is set in an ON state (a selection state or an active state) or is connected to GND, that is, set in a non-active state in accordance with the control made by the control portion 91. Since the function of the control portion 91 needs to be synchronized with the control for other A.C. signal source S, normally, the function of the control portion 91 is implemented by a configuration with which the signal selected by shifting a group of A.C. signal sources S activated, for example, is forward sent by a shift register or the like, and so forth.

A voltage detector DET is connected to the detection electrode 44 to which each of the electrostatic capacitative elements C1_1 to C1_5 is connected. The voltage detector DET illustrated in FIG. 6B is composed of an OP amplifier circuit 81, a rectifying circuit 82, and an A/D converter 83. As shown in FIG. 6B, the OP amplifier circuit 81 is composed of an OP amplifier 84, resistors R1 and R2, and a capacitor C3, and forms a filter circuit for noise removal. An amplification factor of the filter circuit is determined depending on a ratio between resistance values of the resistors R1 and R2, or the like, and thus the amplification factor of the filter circuit functions as a signal amplifying circuit as well. The detection electrode 44 is connected to a non-inverting input terminal (+) of the OP amplifier 84, and the detection signal $V_{det}$ is inputted to the non-inverting input terminal (+) of the OP amplifier 84. The detection electrode 44 is connected to the grounding potential through a resistor R for electrically fixing a D.C. level of the potential of the detection electrode 44. A parallel combination of the resistor R2 and the capacitor C3 is connected between an output terminal and an inverting input terminal (−) of the OP amplifier 84, and the resistor R1 is connected between the inverting input terminal (−) of the operation amplifier 84, and the grounding potential. The rectifying circuit 82 has a diode D1 for carrying out half-wave rectification, a charging capacitor C4, and a discharging resistor R0. An anode of the diode D1 is connected to the output terminal of the OP amplifier circuit 81, and a parallel combination of the charging capacitor C4 and the discharging resistor R0 is connected between a cathode of the diode D1, and the grounding potential. The charging capacitor C4 and the discharging resistor R0 form a smoothing circuit. A potential at the cathode of the diode D1 (an output signal from the rectifying circuit 82) is read out as a digital value through an A/D converter 83. Merely a comparator 85 for comparing an input voltage with a threshold is shown in the A/D converter 83 of FIG. 6B, and thus a partial configuration of the A/D converter 83 differing depending on a comparator type such as a resistor ladder type or a capacitance division type is omitted in illustration here for the sake of simplicity. The digital value outputted from the A/D converter 83 is further compared with a predetermined threshold $V_{th}$ (refer to FIG. 3A) by a comparator (not shown) or the like. Since the comparator can be realized in the form of a function as well of a control circuit (not shown) such as a CPU, an illustration thereof is omitted here for the sake of simplicity. The comparison result is utilized as a signal representing whether or not the touch is made, for example, as a signal representing whether or not the button manipulation is made in the various applications.

The $V_{com}$ drive circuit 9 as "the A.C. drive scanning portion" is formed on the drive substrate 2 side shown in FIG. 4D. However, the detecting circuit 8 as "the detecting portion" may be formed either on the drive substrate 2 side or on the counter substrate 4 side. Since a large number of TFTs are integrated with one another, in order to reduce the number of manufacture process, the detecting circuit 8 is also preferably formed together with these TFTs on the drive substrate 2. However, a wiring resistance increases in some cases because the detection electrode 44 exists on the counter substrate 4 side, and the detection electrode 44 is made of a transparent electrode material. In such cases, in order to avoid the trouble caused by the high wiring resistance, the detecting circuit 8 is preferably formed on the counter substrate 4 side. However, when for merely the detecting circuit 8, the TFT formation process is used in the counter substrate 4, there is a disadvantage that the cost of the manufacture process increases. Thus, it is better that the formation position of the detecting circuit 8 is determined by comprehensively taking the above advantage and disadvantage into consideration.

Next, a description will be given with respect to the shift and the A.C. drive for the counter electrode 43 by the $V_{com}$ drive circuit 9 having the above A.C. signal source S as the basic configuration with reference to FIGS. 7A and 7B. FIG. 7A shows the counter electrodes 43_1 to 43_n obtained through the division using a pixel display line unit (referred to as "a write unit" as well). Also, FIG. 7B shows an equivalent circuit diagram of the touch sensor portion when the counter electrode 43_1 as the first one of the counter electrodes 43_1 to 43_n is driven. As shown in FIG. 7A, the A.C. signal source S is connected to the counter electrode 43_1, and thus the counter electrode 43_1 is A.C. driven. At this time, as previously stated, the equivalent circuit as shown in FIG. 7B is formed in the touch sensor portion. However, in this case, each of the electrostatic capacitance values of the capacitative elements C1_1 to C1_n is expressed by "$C_p$," and a capacitance value of a capacitance component (parasitic capacitance) connected to the detection electrode 44 except for the capacitative elements C1_1 to C1_n is expressed by "$C_c$." Also, an effective value of the A.C. voltage supplied from the A.C. signal source S is expressed by "V1." At this time, the detection signal $V_{det}$ detected by the voltage detector DET has a voltage $V_s$ when no finger touches the detection electrode 44, and has a voltage $V_f$ when the finger touches the detection electrode 44. Hereinafter, each of the voltages $V_s$ and $V_f$ will be referred to as "a sensor voltage."

The sensor voltage $V_s$ in the phase of the non-contact is expressed by Expression (1):

$$V_s = V1 \times \{C_p/(nC_p + C_c)\} \tag{1}$$

It is understood from Expression (1) that each of the electrostatic capacitance values $C_p$ becomes small as the number, n, of division in the counter electrode 43 further increases. Although a denominator of Expression (1) does not change so much because a factor "$nC_p$" of the denominator is approximately held constant, a numerator of Expression (1) becomes small in this case. As a result, the magnitude of the sensor voltage $V_s$ (the effective value of the A.C. voltage) becomes small as the number, n, of division in the counter electrode 43 further increases. For this reason, the number, n, of division may not be made large so much.

On the other hand, when the number, n, of division is small and thus an area of one counter electrode 43_1 is large, a fine potential change (a transient potential change) when the $V_{com}$ A.C. drive is switched among the electrodes appears in the form of a line on the display picture. In order to cope with this situation, although in the first embodiment, as previously stated, the division itself is carried out every pixel display line (every write unit), a plurality of counter electrodes are simultaneously $V_{com}$ A.C. driven. In addition, the partial counter electrodes obtained through the division are continuously selected at least twice. As a result, there are simultaneously attained the prevention of the reduction of the sensor voltage (the reduction of the S/N ratio) caused by increasing the number, n, of division, and the attenuation (obscuring) of the potential change in the phase of the electrode shifting.

FIGS. 8A to 8C are respectively top plan views explaining the A.C. driving operation and the switching operation. The A.C. drive electrode unit EU is composed of the seven counter electrodes each indicated by slant lines in each of FIGS. 8A to 8C. FIGS. 8A to 8C show the transition of the selection area when the A.C. drive electrode unit EU is shifted in the column direction with one pixel line as a unit. Although for a time period T1 of FIG. 8A, a first one write unit is not selected, the counter electrodes corresponding to pixel lines from a second pixel line to an eighth pixel line are selected, and are simultaneously A.C. driven by the A.C. signal source S. In a next cycle (for a time period T2), the A.C. drive electrode unit EU is shifted by one write unit. As a result, as shown in FIG. 8B, the two counter electrodes corresponding to the first and second pixel lines, respectively, are not selected, the seven counter electrodes corresponding to the seven pixel lines in and after the third pixel line, respectively, are selected, and other counter electrodes are not selected. Moreover, in a next cycle (for a time period T3), the A.C. drive electrode unit EU is further shifted by one write unit. As a result, as shown in FIG. 8C, the counter electrodes corresponding to the first to third pixel lines, respectively, are not selected, the seven counter electrodes corresponding to the seven pixel lines in and after the fourth pixel line, respectively, are selected, and other counter electrodes are not selected. After that, the shifting operation and the A.C. driving operation are repetitively carried out similarly to the above case.

From the above description, a method of driving the display drive according to the first embodiment of the present invention can be said as an example of "including the display driving step, and the touch detecting step, the display driving step and the touch detecting step including the A.C. driving step, the detecting step, and the shifting step." In this case, in the display driving step, the voltages applied across a plurality of pixel electrodes 22 disposed in a plane-like shape and in row and column directions, and a plurality of counter electrodes 43 disposed in a plane-like shape so as to face the plurality of pixel electrodes 22, respectively, and separately disposed in a scanning direction parallel with the row or column of the row and column directions are controlled, thereby carrying out expression of gradations of an image. In addition, in the touch detecting step, during the display driving, it is detected on the detection electrode 44 side that the voltages (for example, proportional to the respective sensor voltages $V_s$) applied across the capacitative elements C1 formed between the plurality of counter electrodes 43 and the plurality of detection electrodes 44 facing each other, respectively, are reduced due to the influence of the external capacitance C2. Also, in the A.C. driving step, the continuous two or more counter electrodes are selected from a plurality of counter electrodes 43, and are then A.C. driven. Also, in the detecting step, the magnitude of the A.C. voltage transmitted to the detection electrode 44 side in the phase of the A.C. drive is measured, and it is judged based on the measurement result whether or not there is the external capacitance C2. Also, in the shifting step, objects of selection of the counter electrodes are shifted in the scanning direction so that the common one or more counter electrodes are selected through the continuous two A.C. driving operations.

By carrying out this operation, the effective value of the sensor voltage $V_s$ becomes large all the more because the value of n in Expression (1) is reduced to ⅐ of the number of actual division. On the other hand, as shown in FIGS. 8A to 8C, a unit which is newly contained in the group of counter electrodes selected, and is not contained in the group of counter electrodes selected instead is one counter electrode corresponding to one pixel line. Therefore, a switching frequency of the A.C. drive becomes equal to a 1 H inversion frequency of the common drive signal $V_{com}$. This frequency becomes a very high frequency which is obtained by multiplying a commercial frequency, for example, 60 Hz by the number of pixels in the column direction. For example, when the number of pixels in the column direction is 480, this frequency becomes 28.8 kHz and a frequency of a pulse waveform is half 28.8 kHz, that is, 14.4 kHz. Therefore, the change in image caused by the shift in the A.C. drive has the sufficiently high frequency which is not visible by an eye of the human being. From the above, the prevention of the reduction of the S/N ratio caused by the reduction of the sensor voltage, and the prevention of the deterioration of the image quality caused by the switching of the electrode drive are compatible with each other.

Next, an operation of the liquid crystal display device having the structure and the configuration as described above will be described.

A display driver (such as a horizontal driving circuit and a vertical driving circuit (both not shown)) on the drive substrate 2 supplies the common drive signal $V_{com}$ to the electrode patterns (the counter electrodes 43_1 to 43_n) of the counter electrodes 42 in a line-sequential manner. At this time, how to select the counter electrodes 43, and how to shift the counter electrodes 43 are as described above. The common drive signal $V_{com}$ is used for the control as well for the potentials of the counter electrodes for image display. In addition, the display driver supplies a signal voltage to the pixel electrodes 22 through the signal lines SIG, and controls the switching for the TFTs of the pixel electrodes 22 through the scanning lines SCN in the line-sequential manner synchronously with this operation. As a result, an electric field determined based on the common drive signal $V_{com}$ and the corresponding one of the pixel signals is applied across the liquid crystal layer 6 in the longitudinal direction (a direction vertical to the drive substrate 2) every pixel, thereby modulating the liquid crystal state. In such a manner, the display by the so-called inversion drive is carried out.

On the other hand, on the side of the counter substrate 4, the capacitive elements C1 are formed in the intersections between the electrode patterns (the counter electrodes 43_1 to 43_n) of the counter electrodes 43, and the electrode patterns (the detection electrodes 44_1 to 44_k) of the detection electrodes 44, respectively. When the common drive signal $V_{com}$ is successively applied to the electrode patterns of the counter electrodes 43 in a time division manner, the electric charges are charged/discharged to/from the capacitative elements C1 for one column formed in the intersections between the electrode patterns of the counter electrodes 43 to which the common drive signal $V_{com}$ is successively applied in the time division manner, and the electrode patterns of the detection electrodes 44. As a result, the detection signals $V_{det}$ having the magnitudes corresponding to the capacitance values of the capacitative elements C1 are outputted from the electrode patterns of the detection electrodes 44, respectively. In a state in which no finger of the user touches the surface of the counter substrate 4, the magnitudes of the detection signals $V_{det}$ become approximately constant (the sensor voltage $V_s$). The line of the capacitative elements C1 as objects of the charging/discharging moves in the line sequential manner along with the scanning of the common drive signal $V_{com}$.

Here, when the finger of the user touches any of the positions on the surface of the counter substrate 4, a capacitance C2 caused by the touch of the finger is added to the capacitance of the capacitative element C1 originally formed in the position where the finger of the user touches. As a result, the value (the sensor voltage $V_s$) of the detection signal $V_{det}$ at a time point when the touched position is scanned (that is, when the common signal $V_{com}$ is applied to the electrode pattern, corresponding to the touched position, of the electrode patterns of the counter electrodes 43) becomes smaller than that of the detection signal $V_{det}$ in any of other positions (becomes the sensor voltage $V_f(<V_s)$). The detecting circuit 8 (refer to FIG. 6B) compares the magnitude of the detection signal $V_{det}$ with the threshold voltage $V_{th}$. When the magnitude of the detection signal $V_{det}$ is equal to or smaller than the threshold voltage $V_{th}$, the detecting circuit 8 judges that the position concerned is the touched position. The touched position can be obtained from the timing of application of the common drive signal $V_{com}$, and the timing of detection of the detection signal $V_{det}$ having the magnitude equal to or smaller than the threshold voltage $V_{th}$.

As described above, according to the first embodiment of the present invention, the electrostatic capacitance type touch sensor is configured as follows. That is to say, the common electrode (the counter electrode 43), for the liquid crystal drive, which is originally provided in the liquid crystal display element is used as one as well of a pair of electrodes, for the touch sensor, composed of the drive electrode and the detection electrode. Also, the common drive signal $V_{com}$ for the display drive signal is used as the touch sensor drive signal as well. Therefore, the electrode which is newly provided has to be merely the detection electrode 44, and it is unnecessary to newly prepared the touch sensor drive signal. As a result, both the structure and the configuration are simple. In addition, a plurality of counter electrode are simultaneously A.C. driven, and the group of counter electrodes simultaneously A.C. driven is shifted so that the counter electrodes are together selected in two A.C. driving operations. For this reason, the prevention of the reduction of the S/N ratio of the detection voltages from the touch sensor, and the prevention of the deterioration of the image quality are compatible with each other. Moreover, the disposition space and the power consumption can be saved all the more because the drive electrode and the drive circuit for the common drive signal $V_{com}$ can be used as the sensor driving electrode and the drive circuit as well, respectively.

It is noted that although the detection electrode 44 is shown in the form of a line having a thin width in FIGS. 4A to 4D, and FIGS. 6A and 6B, the detection electrode 44 may be formed to have a large width in the row direction. When the capacitance value of the capacitative element C1 is desired to be made larger because it is too small, it is possible to cope with this situation by making the electrode width large. Contrary to this, for example, when the capacitance value of the capacitative element C1 is desired to be made smaller because the dielectric D is thin and thus the capacitance value of the capacitative element C1 is too large, it is possible to cope with this situation by making the electrode width small. Or, a configuration may also be adopted such that the detection electrode 44 is divided into isolated patterns, and wirings are drawn from the resulting isolated patterns in the column direction, respectively. Although the voltage detectors DETs may be connected to the wirings, respectively, in order to prevent the circuit scale from being scaled up, a plurality of detection electrodes 44 may share one voltage detector DET with one another. For example, the detection electrodes 44 belonging to one column may share one voltage detector DET with one another, and thus the detection may be carried out every detection electrode 44 in the time division manner by the one voltage detector DET concerned.

Change 1

Although in the first embodiment, the group of counter electrodes simultaneously driven (the A.C. drive electrode unit EU) is shifted every one pitch of the counter electrodes obtained through the division, the present invention is by no means limited thereto. For example, the A.C. drive electrode unit EU may be shifted by using two pitches, three pitches, or three or more pitches of the counter electrodes as a unit. However, when the number of pitches described above corresponding to one shifting operation is increased, it is easy to see the switching of the pixels. Therefore, there is actually a limit to the number of pitches. However, which of the stages the number of pitches exerts an influence on the image quality in when the number of pitches corresponding to one shifting operation is continuously increased differs when the size or the like of the capacitor connected to the wiring causing the change in potential differs. Thus, it may be impossible to uniformly decide the number of pitches. In addition, the number of counter electrodes 43, obtained through the division, contained in the A.C. drive electrode unit EU is arbitrarily set as long as it is two or more. However, when the number of counter electrodes 43 is made too large, the meaning of division and shift wears off, and the resolution in the column direction of the touch sensor is reduced. Moreover, the useless power consumption increases because the useless $V_{com}$ drive area increases for the display control and the sensor drive. By taking all these respects into consideration, an upper limit or an optical value of the number of counter electrodes 43 obtained through the division, and contained in the A.C. drive electrode unit EU is determined.

In any case, Change 1 can be said as an example of the structure in which "a plurality of counter electrodes are disposed at equal intervals at a rate of one counter electrode per two or more pixel electrodes, that is, per a predetermined number of pixel electrodes in the scanning direction, and the drive detecting portion shifts the combination of the counter electrodes selected by using the pitch at which the counter electrodes are disposed in the scanning direction as a unit when the A.C. drive is repetitively carried out." It is noted that Change 1 can also be applied to a second embodiment and a fourth embodiment each of which will be described later. In addition, although a plurality of detection electrodes 44, that is, the k detection electrodes are provided, one detection electrode 44 may be provided when the touch detection is carried out merely in the column direction. The first embodiment of the present invention shows the structural example in which the touched position can be detected by utilizing the matrix.

Change 2

Figure 9:
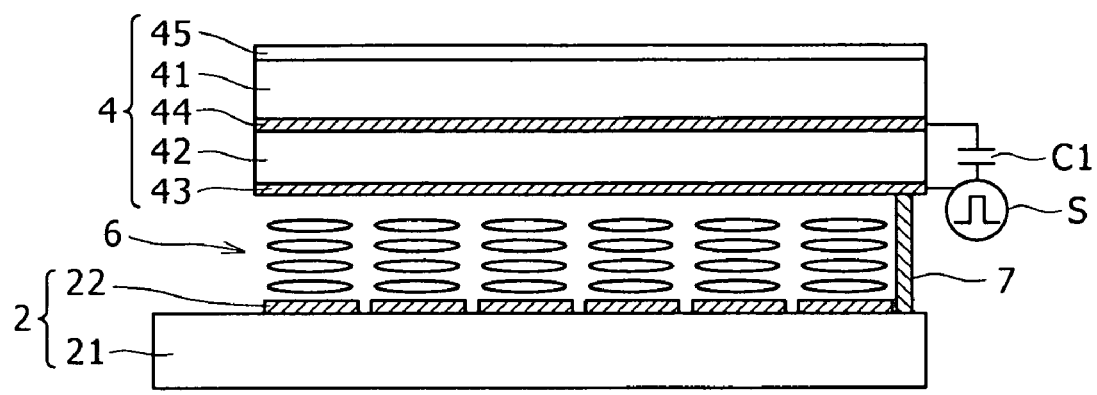
FIG. 9 is a schematic cross sectional view of a display device according to Change 2 of the first embodiment of the present invention.

FIG. 9 shows Change 2 of the first embodiment. In Change 2, the detection electrodes 44 are formed in positions facing the counter electrodes 43 through the color filter 42, respectively, in the cross sectional structure. As a result, although the capacitance value of the capacitative element C1 becomes large, the influence (the capacitance C2) of the approaching of the finger is reduced because the distance from the display surface to each of the detection electrodes 44 becomes long. However, since the size of the finger is larger than any of the pixels, even when the capacitance value of the capacitance C2 is reduced, the influence of the reduction of the capacitance value of the capacitance C2 is minor in relationship with the capacitative element C1 in some cases. Otherwise, conversely, the sensitivity may increase. Therefore, the structure as shown in FIG. 9 can be adopted. Even in the case of the structure shown in FIG. 9, the capacitance value of the capacitative element C1 can be adjusted by suitably changing the width of each of the detection electrodes 44.

Second Embodiment

Next, a second embodiment of the present invention will be described in detail with reference to FIG. 10, FIGS. 11A and 11B, and FIGS. 12A and 12B. In the second embodiment, unlike the case of the first embodiment described above, a liquid crystal element having a transverse electric field mode is used as the display element.

Figure 10:
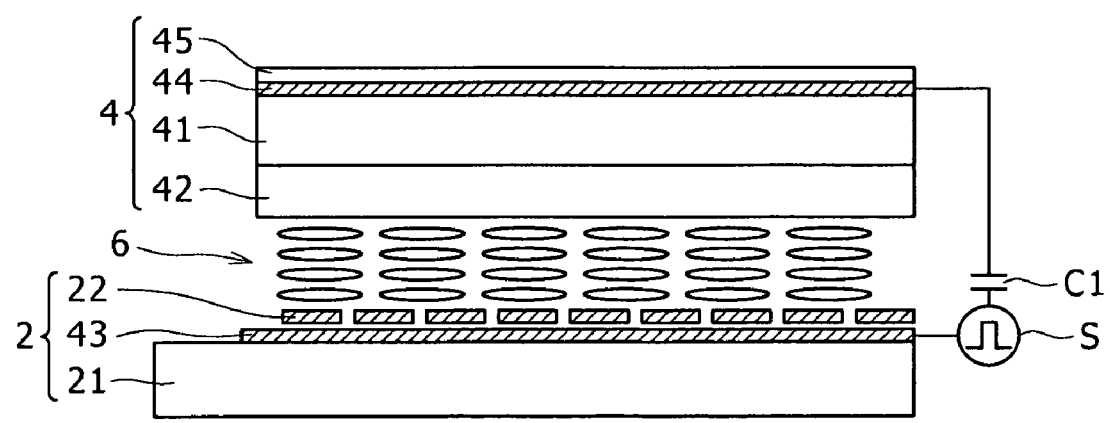
FIG. 10 is a schematic cross sectional view of a display device according to a second embodiment of the present invention.

FIG. 10 is a schematic cross sectional view showing a structure of the liquid crystal display device according to the second embodiment of the present invention. In FIG. 10, portions corresponding to those in the first embodiment are designated with the same reference numerals, respectively, and a description thereof is suitably omitted here for the sake of simplicity.

The display device of the second embodiment is different exclusively to positions of the electrodes (having the different patterns) from the display device of the first embodiment in that the counter electrodes 43 are disposed on the drive substrate 2 side. The counter electrodes 43 in the second embodiment are disposed so as to face the pixel electrodes 22 on the side opposite to the liquid crystal layer 6 side. Here, by "facing disposition," although not especially illustrated, a distance between the pixel electrodes 22 is set as being relatively large, and thus the counter electrodes 43 apply an electric field from portions between the pixel electrodes 22 to the liquid crystal layer 6. That is to say, there is obtained the liquid crystal display having the transverse electric field mode in which a direction of application of the electric field to the liquid crystal layer 6 is a transverse direction. Limited exclusively to the disposition in the cross section, other structures of the liquid crystal display device of the second embodiment are the same as those in the first embodiment.

Since the capacitative elements C1 are formed between the detection electrodes 44 and the counter electrodes 43, respectively, each of the capacitance values thereof is smaller than that of each of the capacitative elements C1 in the first embodiment (refer to FIG. 4D). However, it is possible to compensate for the large intervals between the pixel electrodes by taking measures for making the width of each of the pixel electrodes large. In addition, the sensitivity increases in relationship with the capacitance C2 in some cases.

The liquid crystal layer 6 serves to modulate a light being transmitted through the liquid crystal layer 6 in accordance with the state of the electric field. A liquid crystal having the transverse electric field mode such as a Fringe Field Switching (FFS) mode or an In-plane Switching (IPS) mode is used in the liquid crystal layer 6.

Next, a more detailed description will be given with reference to FIGS. 11A and 11B. In the liquid crystal element having the FFS mode shown in FIGS. 11A and 11B, the pixel electrode 22 patterned in a pectinate-like shape is disposed on the counter electrode 43 formed on the drive substrate 2 through an insulating layer 25, and an alignment film 26 is formed so as to cover the pixel electrode 22. The liquid crystal layer 6 is held between the alignment film 26 and an alignment film 46 on the counter substrate 4 side. Two sheets of polarizing plates 24 and 47 are disposed in a cross-Nicol state. A rubbing direction of the two sheets of polarizing plates 24 and 47 aligns with a transmission axis of one of the two sheets of polarizing plates 24 and 47. FIG. 10 shows the case where the rubbing direction aligns with a transmission axis of a protective layer 45 on the emission side. Moreover, the rubbing direction of the two sheets of alignment films 26 and 46, and the direction of the transmission axis of the protective layer 45 are set approximately in parallel with an extension direction (a longitudinal direction of the pectinate-like shape) of the pixel electrode 22 so as to fall within the range in which a rotational direction of liquid crystal molecules is regulated.

Next, a description will be given with respect to an operation of the liquid crystal display device having the structure as described above.

Figure 12A:
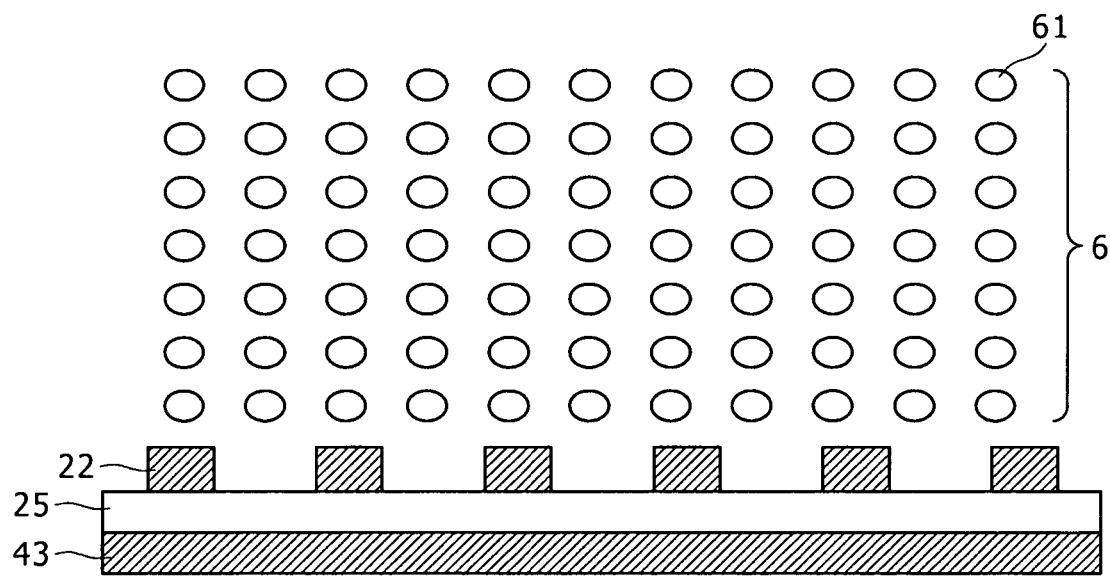
FIGS. 12A and 12B are respectively cross sectional views each explaining the operation of the FFS mode liquid crystal element in the display device according to the second embodiment of the present invention.
Figure 12B:
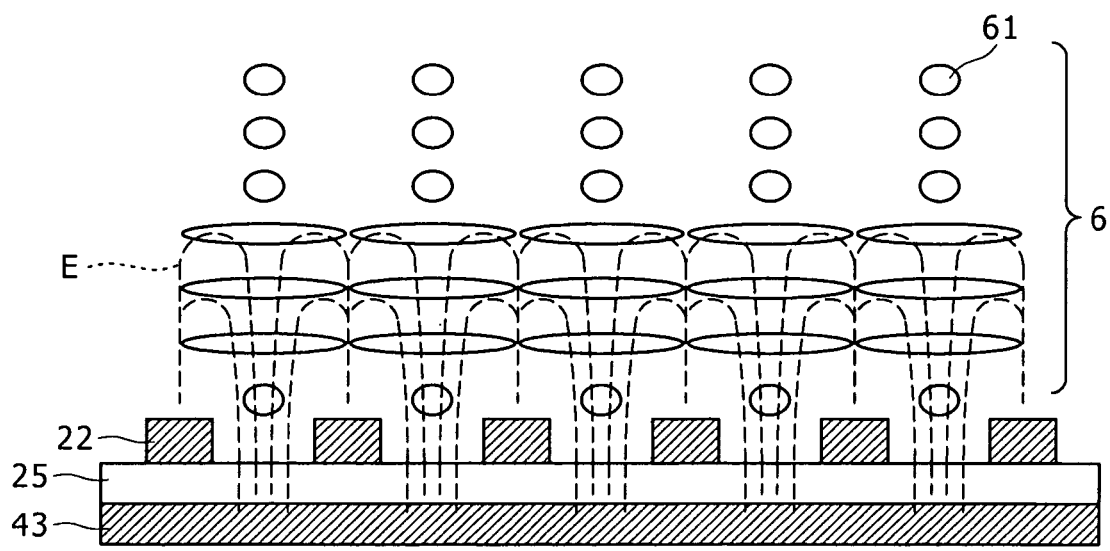

Firstly, the principle of the displaying operation of the liquid crystal element having the FFS mode will be described in brief with reference to FIGS. 11A and 11B, and FIGS. 12A and 12B. Here, FIGS. 12A and 12B each show an enlarged cross section of a main portion of the liquid crystal element. That is to say, FIG. 12A shows a state of the liquid crystal element in a phase of non-application of an electric field, and FIG. 12B shows a state of the liquid crystal element in a phase of application of an electric field.

In a state in which no voltage is applied across the counter electrode 43 and the pixel electrode 22 (refer to FIG. 11A and FIG. 12A), an axis of each of liquid crystal molecules 61 composing the liquid crystal layer 6 intersects at a right angle with the transmission axis of the polarizing plate 24 on the incidence side, and is parallel with the transmission axis of the polarizing plate 45 on the emission side. For this reason, an incident light h transmitted through the polarizing plate 24 on the incidence side reaches the protective layer 45 on the emission side without undergoing a phase difference within the liquid crystal layer 6 to be absorbed by the protective layer 45 on the emission side. As a result, black display is obtained. On the other hand, in a state in which the voltage is applied across the counter electrode 43 and the pixel electrode 22 (refer to FIG. 11B and FIG. 12B), the alignment direction of each of the liquid crystal molecules 61 rotates in an oblique direction with respect to the extension direction of the pixel electrode 22 by application of a transverse electric field E generated between the pixel electrodes. In this case, a strength of the transverse electric field E in a phase of white display is optimized so that the liquid crystal molecule 61 located at a center in a thickness direction of the liquid crystal layer 6 rotates by about 45°. As a result, the incident light h transmitted through the polarizing plate 24 on the incidence side undergoes the phase difference while being transmitted through the liquid crystal layer 6 to become a linearly polarized light rotating by 90°. Also, since the linearly polarized light is then transmitted through the protective layer 45 on the emission side, white display is obtained.

It is noted that the touch sensor portion in the second embodiment is merely different in disposition of the electrodes within the cross sectional structure from that in the first embodiment, and thus the basic operation thereof is common to the first embodiment. That is to say, the counter electrodes 43 are driven in the column direction by repetitively carrying out the $V_{com}$ A.C. driving operation and the shifting operation, and a difference between the sensor voltages $V_s$ and $V_f$ at this time is detected through the voltage detector DET. Also, a sensor voltage v detected as a digital value is compared with the threshold voltage $V_{th}$, thereby detecting the position where the finger either contacts or approaches the detection electrode 44 by using the matrix disposition. At this time, similarly to the case of the first embodiment, as shown in FIGS. 8A to 8C, the m (m=7 in FIGS. 8A to 8C) counter electrodes 43 are simultaneously A.C. driven. Thus, after the A.C. drive electrode unit EU is shifted by one counter electrode 43 corresponding to one write unit every cycle, the A.C. driving operation is carried out again. Thus, the shifting operation, and the A.C. driving operation are repetitively carried out. For this reason, the sensor voltage $V_s$ becomes large all the more because the value of the number, n, of division in Expression (1) is reduced to 1/m of the number of actual division. On the other hand, as shown in FIGS. 8A to 8C, the unit which is newly contained in the group of counter electrodes selected, and is not contained in the group of counter electrodes selected instead is one counter electrode corresponding to one pixel line. Therefore, a switching frequency of the A.C. drive becomes equal to a 1 H inversion frequency of the common drive signal $V_{com}$. This frequency becomes a very high frequency which is obtained by multiplying a commercial frequency, for example, 60 Hz by the number of pixels in the column direction. For example, when the number of pixels in the column direction is 480, this frequency becomes 28.8 kHz and a frequency of a pulse waveform is half 28.8 kHz, that is, 14.4 kHz. Therefore, the change in image caused by the shift in the A.C. drive has the sufficiently high frequency which is not visible by an eye of the human being. From the above, the prevention of the reduction of the S/N ratio caused by the reduction of the sensor voltage, and the prevention of the deterioration of the image quality caused by the switching of the electrode drive are compatible with each other.

In addition to the effects described above, similarly to the case of the first embodiment, there is an advantage that the configuration is simple because of the sharing of the electrodes for the $V_{com}$ drive and the sensor drive. In addition, the disposition space and the power consumption can be saved all the more because the drive electrode and the drive circuit for the common drive signal $V_{com}$ can be used as the sensor driving electrode and the drive circuit as well, respectively.

Change 1

Figure 13:
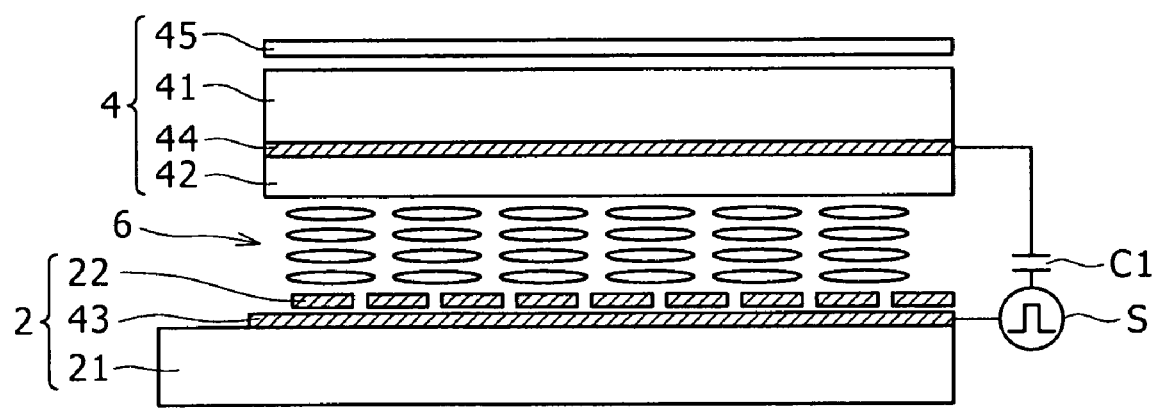
FIG. 13 is a schematic cross sectional view of a display device according to Change 1 of the second embodiment of the present invention.

FIG. 13 shows Change 1 of the second embodiment of the present invention. In Change 1, the detection electrodes 44 are formed in positions facing the counter electrodes 43 through the color filter 42, respectively, in the cross sectional structure. As a result, although the capacitance value of the capacitative element C1 can be made large. In particular, in the second embodiment in which the distance between the sensor electrodes (the counter electrode 43 and the detection electrode 44) is long, it is preferable that the capacitance value of the capacitative element C1 is made large. It is noted that the influence (the capacitance C2) of the approaching of the finger is reduced because the distance from the display surface to each of the detection electrodes 44 becomes long. However, since the size of the finger is larger than any of the pixels, even when the capacitance value of the capacitative C2 is reduced, making the capacitance value of the capacitative element C1 large results in that the sensitivity increases in some cases. In such cases, the structure as shown in FIG. 13 can be adopted. In such cases as well, the capacitance value of the capacitative element C1 can be adjusted by suitably changing the width of each of the detection electrodes 44.

Third Embodiment

A third embodiment provides another driving method which can be applied to the liquid crystal display device having any of the structures of the first and second embodiments described above.

FIG. 14 shows a method of A.C. driving the counter electrodes according to the third embodiment of the present invention. FIG. 14 is illustrated instead of FIGS. 8A to 8C. Thus, other figures, that is, FIGS. 4A to 4D to FIG. 13 can be applied to the third embodiment as well. However, in each of the first embodiment and second embodiment (including Changes 1 and 2 as well) described above, the $V_{com}$ driving circuit 9 and the A.C. signal source S shown in FIGS. 4A to 4D, FIGS. 6A and 6B, FIGS. 7A and 7B, etc. select a plurality of counter electrodes 43 (the A.C. drive electrode unit EU) to be A.C. driven by using one or more predetermined pixel display lines (write unit) as a unit. On the other hand, in the third embodiment, a pitch length (a sum of a width of the counter electrode and a distance between the adjacent counter electrodes) of the n counter electrodes obtained through the division in the scanning direction is set as being double or more a pitch length of the pixel display lines (write unit) in the scanning direction, that is, a pitch length of the dispositions of the pixel electrodes. In FIGS. 14A to 14C, the counter electrode pixels having the pitch length are formed at the rate of one counter electrode pixel per three pixel display lines is formed as an example. It is noted that since actually, the number of pixels in the scanning direction is an even number, the counter electrodes are preferably formed through the division at the rate of one counter electrode per an even number of pixel display lines.

An A.C. drive scanning portion in the third embodiment (corresponding to the $V_{com}$ drive circuit 9 shown in FIGS. 4A to 4D, etc.) firstly selects a counter electrode 43_1, and applies the $V_{com}$ A.C. voltage to the counter electrode 43_1 thus selected. For a time period T1 for which the counter electrode 43_1 is A.C. driven, a write drive scanning portion in the third embodiment (not shown)(for example, corresponding to a vertical driving circuit V-DRV shown in FIGS. 15A and 15B in a fourth embodiment), as shown in FIG. 14A, successively scans the three pixel display lines corresponding to the counter electrode 43_1, thereby carrying out the display control.

For a next time period T2, the write drive scanning portion selects the counter electrode 43_2, and thus merely the counter electrode 43_2 is $V_{com}$ A.C. driven. For the time period T2, the vertical driving circuit V-DRV (not shown) successively scans three pixel display lines corresponding to the counter electrode 43_2, thereby carrying out the display control similarly to the above case. After that, the control for a next time T3 shown in FIG. 14C is carried out similarly to the above case. This control operation (the shifting operation for the counter electrodes as objects of the $V_{com}$ A.C. drive, and the write scanning operation) is repetitively carried out, thereby completing the display control for one picture.

In the third embodiment, although the first request described above is fulfilled by the $V_{com}$ A.C. drive, for the second request and the third request, there are the case where these requests are fulfilled depending on the conditions, and the case where that is not the case. Describing in detail, when the number, n, of division of the counter electrodes 43 in the scanning direction is small, the resolution of the touch sensor is reduced. On the other hand, when the number, n, of division is large, there is caused an inconvenience that the S/N ratio is reduced due to the reduction of the sensor voltage $V_s$, and the switching of the counter electrodes being $V_{com}$ driven within one picture is seen in the form of the line because an area of one counter electrode is large. In order to cope with this situation, for the number, Y, of pixels in the scanning direction (in the column direction), the pitch of one counter electrode (for example, the counter electrode 43_1) obtained through the division in the scanning direction is set as being double or more the pixel pitch (pixel electrode pitch).

Fourth Embodiment

In the first embodiment, and Changes 1 and 2 thereof, the second embodiment and Change 1 thereof, and the third embodiment, which of the sides of the drive substrate 2 and the counter substrate 4 the detecting circuit 8 is provided on is arbitrarily set. In a fourth embodiment, a mounting structure is shown by taking the case where the $V_{com}$ driving circuit 9 is formed on the drive substrate 2, and the detecting circuit 8 is formed on other external substrate as an example.

FIG. 15A shows a disposition example of a circuit portion on the drive substrate 2. In the drive substrate 2 shown in FIG. 15A, the vertical driving circuit V-DRV as "the write drive scanning portion," and the $V_{com}$ driving circuit 9 are disposed on one side and the other side in the row direction in the periphery of the display portion in which the n counter electrodes 43 are disposed in the column direction. In addition, a horizontal driving circuit H-DRV is disposed on one side in the column direction. The vertical driving circuit V-DRV, the $V_{com}$ driving circuit 9, and the horizontal driving circuit H-DRV are collectively formed in the same TFT manufacture process. Here, the feature of the fourth embodiment is that the detecting circuit 8 is formed on none of the drive substrate 2 and the counter substrate 4, but is realized in the form of a circuit which is mounted in an IC or a substrate drawn from a display panel through a flexible substrate FLS.

FIG. 15B shows a state in which the display panel is formed by disposing the counter substrate 4 above the drive substrate 2, and the flexible substrate FLS is connected to the drive substrate 2. Each of the flexible substrate FLS and the drive substrate 2 is provided with a large number of connection terminals. A part of a large number of connection terminals is used for supply of signals and voltages for the vertical driving circuit V-DRV, the horizontal driving circuit H-DRV, and the $V_{com}$ driving circuit 9. In the fourth embodiment, output signals from the detection electrodes 44 are drawn to the outside of the display panel by using the remaining part of these connection terminals. In addition, the detecting circuit 8 is realized in the form of the IC or the circuit mounted in the flexible substrate FLS. For this reason, the detection electrodes 44 need to intersect with the formation area of the horizontal driving circuit H-DRV. In the phase of the image display, the horizontal driving circuit H-DRV actively operates in accordance with the signal having a relatively large amplitude. For this reason, there is the possibility that the signal quality is reduced due to the noises when the analog detection signal $V_{det}$ having the relatively small amplitude before being inputted to the detecting circuit 8 intersects in position with the horizontal driving circuit H-DRV.

Figure 16:
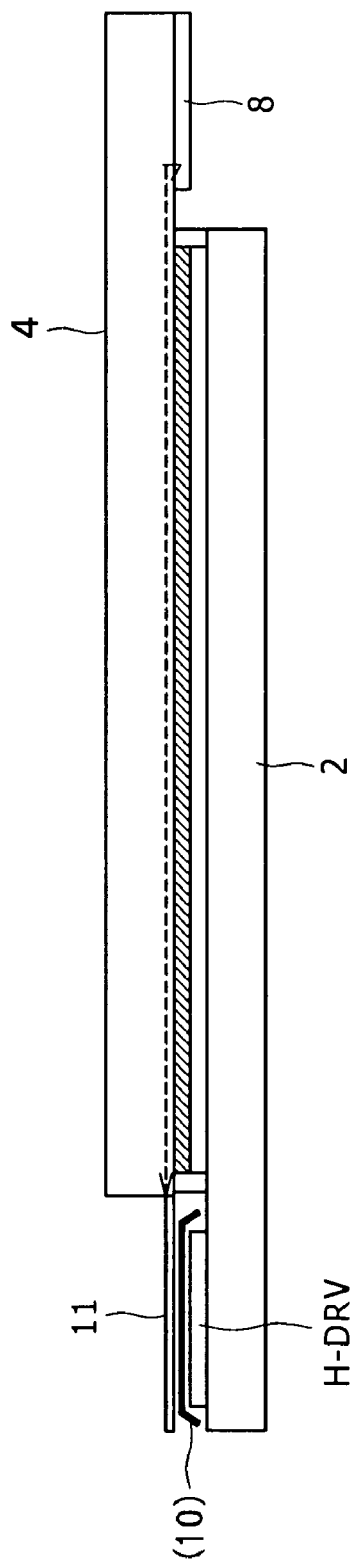
FIG. 16 is a cross sectional view showing a panel structure of Change 1 of the fourth embodiment of the present invention.

In the fourth embodiment, with the view of either preventing or reducing the influence of such noises, when the detection electrodes 44 intersect with portions above the drive substrate 2 side circuits such as the horizontal driving circuit H-DRV, there is provided a shielding layer 10 which is fixed between each of the detection electrodes 44 and each of the drive substrate 2 side circuits such as the horizontal driving circuit H-DRV in terms of the potential. As a result, there is obtained an advantage that the reduction of the S/N ratio of the detection signal $V_{det}$ can be effectively prevented. It is noted that when as shown in FIG. 16, the detection circuit 8 is provided on the counter substrate 4 side, and a wiring 11 from which the detection signal after being converted into the digital signal is drawn to the outside is wired above the horizontal driving circuit H-DRV, the shielding layer 10 is not necessarily provided. However, in this case as well, the shielding layer 10 may be provided in order to make assurance doubly sure.

The present application contains subject matter related to that disclosed in Japanese Priority Patent Application JP 2008-104079 filed in the Japan Patent Office on Apr. 11, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A display device, comprising:
a plurality of pixels disposed in a matrix;
pixel electrodes provided so as to correspond to said plurality of pixels, respectively;
n (n≧2) counter electrodes which are disposed separately from one another in a scanning direction as one disposition direction of said plurality of pixels so as to face said pixel electrodes, respectively, and which extend in the other direction intersecting perpendicularly the scanning direction;
a display functional layer having a function of displaying an image in accordance with voltages applied across said pixel electrodes and said n counter electrodes facing each other, respectively;
a write drive scanning portion for repetitively carrying out an operation for writing signal voltages for display to a predetermined number of pixel electrodes disposed in the other direction, and a shifting operation for successively switching the predetermined number of pixel electrodes as objects of write of the signal voltages for display in the scanning direction;
detection electrodes having respective electrostatic capacitances between said counter electrodes and said n detection electrodes;
an alternate current drive scanning portion for alternate current driving s (n>s≧1) counter electrodes of said n counter electrodes, and shifting the s counter electrodes along with the shifting operation carried out by said drive scanning portion; and
a detecting portion for detecting a change in voltage for the alternate current drive caused in each of said detection electrodes due to an influence of an external capacitance.

2. The display device according to claim 1, wherein said alternate current drive scanning portion shifts the s counter electrodes so as to include the counter electrodes facing a predetermined number of pixel electrodes as objects of update of write of the signal voltages for display.

3. The display device according to claim 2, wherein said n counter electrodes are disposed at an interval double or more a pitch which the disposition of said pixels has in the scanning direction; and
said write drive scanning portion and said alternate current drive scanning portion, when the predetermined number of pixel electrodes is set as one write unit, carry out an operation for writing the signal voltages for display every write unit in the two or more write units facing the counter electrodes being alternate current driven, and, after completion of the writing operation for the two or more write units, switch the objects of the alternate current drive over to the adjacent other counter electrodes, thereby carrying out the operation for writing the signal voltages for display every write unit in the other two or more write units facing the other counter electrodes.

4. The display device according to claim 1, wherein said alternate current drive scanning portion selects the two or more s counter electrodes from said n counter electrodes, and alternate current drives the two or more s counter electrodes thus selected.

5. The display device according to claim 4, wherein said alternate current drive scanning portion repetitively carries out the alternate current driving operation while shifting the objects of selection of said counter electrodes in the scanning direction, thereby shifting the s counter electrodes so that the one or more common counter electrodes are included in the objects of selection in the continuous two alternate current driving operations while the alternate current driving operation is repetitively carried out.

6. The display device according to claim 1, wherein an interval of said counter electrodes is an integral multiple of the pixel pitch.

7. The display device according to claim 1, wherein said plurality of pixels include switches connected to one another through a plurality of scanning lines and a plurality of signal lines, each of said switches serving to write the signal voltage for display from the corresponding one of said plurality of signal lines in accordance with an applied voltage to the corresponding one of said plurality of scanning lines; and said write drive scanning portion writes the signal voltages for display from the corresponding ones of said plurality of signal lines to the predetermined number of pixel electrodes by turning ON the corresponding ones of said switches, and successively switches the predetermined number of pixel electrodes as the objects of update of write of the signal voltages for display in the scanning direction in accordance with the applied voltages to the corresponding ones of said plurality of scanning lines.

8. The display device according to claim 1, wherein said n counter electrodes are disposed at equal intervals in the scanning direction by the same number as that of pixels; and said alternate current drive scanning portion shifts a combination of the counter electrodes to be alternate current driven by using a pitch at which the counter electrodes are disposed in the scanning direction as a unit.

9. The display device according to claim 1, wherein said n counter electrodes are disposed at equal intervals in the scanning direction at a rate of one counter electrode per two or more pixels; and said alternate current drive scanning portion, when repetitively carrying out the alternate current driving operation, shifts a combination of the counter electrodes selected by using a pitch at which the counter electrodes are disposed in the scanning direction as a unit.

10. The display device according to claim 1, wherein the plurality of detection electrodes are disposed separately from one another in the other direction intersecting perpendicularly the scanning direction; and said detecting portion includes a plurality of voltage detector circuits for detecting changes in voltages for the alternate current drive caused by influences of external capacitances, respectively.

11. A method of driving a display device, comprising the steps of:

controlling voltages applied across a plurality of pixel electrodes provided so as to correspond to pixels, disposed in a matrix, respectively, and n (n≧2) counter electrodes disposed separately from one another in a scanning direction as one disposition direction of said plurality of pixel electrodes so as to face said plurality of pixel electrodes, respectively, thereby expressing gradations of an image; and detecting changes in outputs, caused by influences of external capacitances, from detection electrodes having electrostatic capacitors formed between the n counter electrodes and said detection electrodes, respectively;

the first step comprising the steps of repetitively carrying out an operation for writing signal voltages for display to a predetermined number of pixel electrodes disposed in the other direction intersecting perpendicularly the scanning direction, and shifting operation for successively switching the predetermined number of pixel electrodes as objects of write in the scanning direction; and alternate current driving s (n>s≧1) counter electrodes of said n counter electrodes, and shifting the s counter electrodes in the scanning direction along with the shifting operation;

wherein in the second step, the changes in outputs based on the alternate current drive for said counter electrodes are detected.

12. The method of driving a display device according to claim 11, wherein in the alternate current driving step in the first step, the s counter electrodes are shifted so as to include the counter electrodes facing a predetermined number of pixel electrodes as objects of update of write of the signal voltages for display.

13. The method of driving a display device according to claim 11, wherein in the write drive step in the first step, the continuous two or more s counter electrodes are selected from said n counter electrodes and are alternate current driven, the alternate current driving operation is repetitively carried out while the objects of selection of the counter electrodes are shifted in the scanning direction, and the shifting operation is carried out so that the common one or more counter electrodes are included in the objects of selection while the alternate current driving operation is repetitively carried out.

14. The method of driving a display device according to claim 11, wherein in the write drive step and the alternate current driving step in the first step, in a case where said n counter electrodes have a pitch double or more a pitch which a disposition of said pixel electrodes has in the scanning direction, when the predetermined number of pixel electrodes is set as one write unit, in two or more write units facing the counter electrodes being alternate current driven, the writing operation is carried out every write unit;

after completion of the writing operation for the two or more write units, the objects of the alternate current drive are switched over to adjacent other counter electrodes; and the writing operation is carried out every write unit in the other two or more write units facing the adjacent other counter electrodes.

15. The method of driving a display device according to claim 11, wherein in the first step, in both the shifting operation for switching the objects of write, and the shifting operation for shifting the s counter electrodes as the objects of the alternate current drive, shifting from one side to the other side in the scanning direction is repetitively, cyclically carried out multiple times in the same direction.

* * * * *